US009785304B2

(12) United States Patent
Hanson et al.

(10) Patent No.: US 9,785,304 B2
(45) Date of Patent: Oct. 10, 2017

(54) LINKING CUSTOMER PROFILES WITH HOUSEHOLD PROFILES

(71) Applicant: BANK OF AMERICA CORPORATION, Charlotte, NC (US)

(72) Inventors: Carrie Anne Hanson, Charlotte, NC (US); Alicia C. Jones-McFadden, Fort Mill, SC (US); Craig Sobol, Waxhaw, NC (US); Brent Alan Shelkey, Huntersville, NC (US); Shuangshuang Li, Pittsburgh, PA (US); Ivory Assan, Columbia, SC (US); Matthew Hsieh, Darby, PA (US); Shira Bauman, Baltimore, MD (US); Gabriela Moreno Cesar, The Woodlands, TX (US)

(73) Assignee: Bank of America Corporation, Charlotte, NC (US)

( * ) Notice: Subject to any disclaimer, the term of this patent is extended or adjusted under 35 U.S.C. 154(b) by 434 days.

(21) Appl. No.: 14/530,397

(22) Filed: Oct. 31, 2014

(65) Prior Publication Data

US 2016/0125036 A1 May 5, 2016

(51) Int. Cl.
| | | |
|---|---|---|
| *G06F 17/30* | (2006.01) | |
| *G06F 3/0481* | (2013.01) | |
| *H04L 29/08* | (2006.01) | |
| *G06Q 10/00* | (2012.01) | |

(52) U.S. Cl.
CPC ...... *G06F 3/0481* (2013.01); *G06F 17/30029* (2013.01); *G06F 17/30867* (2013.01); *G06Q 10/00* (2013.01); *H04L 67/30* (2013.01)

(58) Field of Classification Search
CPC ............ G06F 3/0481; G06F 17/30867; G06F 17/30029; G06Q 10/00; H04L 67/30
See application file for complete search history.

(56) References Cited

U.S. PATENT DOCUMENTS

| | | | |
|---|---|---|---|
| 5,724,567 | A | 3/1998 | Rose et al. |
| 5,918,236 | A | 6/1999 | Wical |
| 5,953,732 | A | 9/1999 | Meske, Jr. et al. |
| 5,978,799 | A | 11/1999 | Hirsch |
| 6,177,932 | B1 | 1/2001 | Galdes et al. |
| 6,510,431 | B1 | 1/2003 | Eichstaedt et al. |
| 6,678,685 | B2 | 1/2004 | McGill et al. |

(Continued)

*Primary Examiner* — Alexander Khong
(74) *Attorney, Agent, or Firm* — Michael A. Springs; Moore & Van Allen PLLC; Peter B. Stewart

(57) ABSTRACT

Embodiments of the invention comprise systems, computer program products, and methods for generating a response to a user search. User input is received to create a household profile, wherein the household profile comprises information related to the members of the household. The user also provides a search for information in which the user may be interested. The household profiles may be utilized along with the search, and with other information, such as user profile information, account information, or dynamic contextual questions to provide search results or updated search results, and dynamic contextual information or updated dynamic contextual information for tailoring the search results to the user. The user may select which households, which individuals in the households, and/or information about the individuals to use in the search. As such, the search results for the user may be more tailored to the results in which the user is interested.

20 Claims, 11 Drawing Sheets

(56) References Cited

U.S. PATENT DOCUMENTS

| | | |
|---|---|---|
| 7,080,071 B2 | 7/2006 | Henrion et al. |
| 7,103,556 B2 | 9/2006 | Del Rey et al. |
| 7,299,222 B1 | 11/2007 | Hogan et al. |
| 7,315,837 B2 | 1/2008 | Sloan et al. |
| 7,409,364 B1 | 8/2008 | Barton et al. |
| 7,565,630 B1 | 7/2009 | Kamvar et al. |
| 7,613,992 B1 | 11/2009 | Raichur et al. |
| 7,890,405 B1 | 2/2011 | Robb |
| 8,037,147 B1 | 10/2011 | Herold et al. |
| 8,065,230 B1 | 11/2011 | Little |
| 8,078,607 B2 | 12/2011 | Oztekin et al. |
| 8,082,242 B1 | 12/2011 | Mysen et al. |
| 8,086,508 B2 | 12/2011 | Dheer et al. |
| 8,271,509 B2 | 9/2012 | Dauginas et al. |
| 8,290,866 B1 | 10/2012 | Little |
| 8,374,944 B2 | 2/2013 | Robb |
| 8,417,608 B2 | 4/2013 | Benefield et al. |
| 8,504,554 B2 | 8/2013 | Raichur et al. |
| 8,719,292 B2 | 5/2014 | Nussel et al. |
| 9,141,617 B1 * | 9/2015 | Gargi ................ G06F 17/30029 |
| 2003/0220915 A1 | 11/2003 | Fagan et al. |
| 2003/0220917 A1 | 11/2003 | Copperman et al. |
| 2005/0071741 A1 | 3/2005 | Acharya et al. |
| 2005/0108406 A1 | 5/2005 | Lee et al. |
| 2006/0106788 A1 | 5/2006 | Forrest |
| 2007/0192166 A1 | 8/2007 | Van Luchene |
| 2008/0147788 A1 | 6/2008 | Omoigui |
| 2008/0319952 A1 | 12/2008 | Carpenter et al. |
| 2009/0012887 A1 | 1/2009 | Taub et al. |
| 2009/0287683 A1 * | 11/2009 | Bennett ............. G06F 17/30867 |
| 2010/0250578 A1 | 9/2010 | Athsani et al. |
| 2010/0287242 A1 | 11/2010 | Kumar |
| 2010/0312724 A1 | 12/2010 | Pinckney et al. |
| 2011/0055207 A1 | 3/2011 | Schorzman et al. |
| 2011/0125623 A1 | 5/2011 | DeLillio |
| 2011/0145234 A1 | 6/2011 | Hu |
| 2011/0252011 A1 | 10/2011 | Morris et al. |
| 2012/0054645 A1 | 3/2012 | Hoomani et al. |
| 2012/0054646 A1 | 3/2012 | Hoomani et al. |
| 2012/0089500 A1 | 4/2012 | Dheer et al. |
| 2012/0179573 A1 * | 7/2012 | Falcone ............. G06Q 30/0601 705/26.8 |
| 2012/0265615 A1 | 10/2012 | Munisamy et al. |
| 2013/0031081 A1 | 1/2013 | Vijayaraghavan et al. |
| 2013/0097061 A1 | 4/2013 | Saich et al. |
| 2013/0103580 A1 | 4/2013 | Ventura |
| 2013/0151527 A1 | 6/2013 | Bruich et al. |
| 2013/0167044 A1 | 6/2013 | Graves et al. |
| 2013/0282749 A1 * | 10/2013 | Batraski ............ G06F 17/30864 707/767 |
| 2014/0019462 A1 | 1/2014 | Heck et al. |
| 2014/0101014 A1 | 4/2014 | Iimuro et al. |
| 2014/0129442 A1 | 5/2014 | Hanson et al. |
| 2014/0143141 A1 | 5/2014 | Kumar |
| 2014/0195621 A1 | 7/2014 | Rao Dv |
| 2014/0207882 A1 | 7/2014 | Joo et al. |

* cited by examiner

LINKING CUSTOMER PROFILES WITH HOUSEHOLD PROFILES

FIELD

This invention relates generally to the field of content searching, and more particularly, to improvements to a system that utilizes various sources of information to tailor the content searching for a particular user, and to display the search results and other information in a specialized interface.

BACKGROUND

Content search results are limited to the text inputted by a user searching for the content. It is difficult to provide more tailored search results for the user.

BRIEF SUMMARY

Embodiments of the present invention address the above needs and/or achieve other advantages by providing apparatuses (e.g., a system, computer program product, and/or other device) and methods that help improve the search results (e.g., the content within the search results) for the users (e.g., customers, clients, potential customers, potential clients, or the like).

In some embodiments the invention the contextual search includes first receiving a search from a user related to a topic(s) in which the user is interested. The search may include search terms, keywords, phrases, filter selections, or the like. In response to the search the present invention determines search results for the user based at least in part on the search received from the user. In other embodiments, the search results may also be determined based on user profile information or user account information. In addition to determining the search results, the contextual search also includes determining dynamic contextual information to present to the user to tailor the search results to the user. The dynamic contextual information may include contextual search questions, user profile questions, user account information, and/or other like information. The dynamic contextual information may be based on the search terms received from the user, the user's current user profile at the time of the search, the user's current account information at the time of the search, or the like. The search results and/or the dynamic contextual information is displayed to the user in a contextual search interface, which may include separate sections for the search results, content information, and dynamic contextual information.

The contextual search tool receives selections from the user regarding the dynamic contextual information, such as but not limited to answers to contextual questions, information for the user's profile, user account information to utilize in the search, information related to the content selections made by the user, and/or input provided by an advisor. As will be discussed in further detail later the system of the present invention receives the various types of information, and updates the search results and the dynamic contextual information and presents the updated search results, updated content, and updated dynamic contextual information to the user.

Moreover, embodiments of the present invention include a means for generating search results for a user search, based at least in part on a household profile of the user. The present invention is configured to utilize household profile information of a user that includes the profiles, account information, or other like information of other individuals in order to tailor the search results and dynamic contextual information provided to a user in response to a user search. The user may set up the household profiles to include information of individuals that are also customers of the institution, or other individuals that are not customers of the institution. Moreover, multiple household profiles may be set up to create different types of households. The user may elect to include household profiles, individuals therein, or specific information for the individuals in a search in order to customize the search results and dynamic contextual information that is determined and presented to the user.

As such, the invention of the present invention improves the ability of the search tool to provide tailored, customized, and relevant search results to the user based not only on the search terms provided by the user, but based on dynamic contextual information that changes when the user takes actions within the contextual search interface. The search of the present invention is an improvement over traditional search methods because it actively updates the search results as the contextual search identifies the specific information in which the user is interested. The present invention reduces the amount of time it takes for a user to identify the relevant content in which the user may be interested because it allows the user to tailor the search, or filter the search results, based on specific information provided by the user for which only the user or the company (e.g. financial institution) associated with the contextual search may have access. In traditional searching, the user may not know exactly what to search for, and the search algorithm may not know how to take the user search terms and find the best results for the user because it may not have all of the necessary information to provide the tailored search results. As such, the present invention bridges the gap between the user's knowledge and the search algorithm's ability to identify information by providing technical solutions that augment or enhance the initial search results for the user based on additional contextual information that is presented to the user, which the user can select as being important or not important to the user's search results. For at least these reasons, the present invention related to the contextual search tool is significantly more than the traditional searching tools.

Moreover, the system (e.g., processor, or the like) of the present invention allows for the dynamic interface of the contextual search tool to change and provide the tailored search results as the user enters search terms, selects or deselects the dynamic contextual information to include or exclude from the search, selects particular search results, and views content within the contextual search interface. The dynamic nature of the interface cannot be performed by a human with pen and paper because among other reasons, the human would not be able to present the dynamic interface that changes in real-time or near real-time as the user takes the different actions described herein with respect to the search, including selecting the dynamic contextual information.

In addition, the present invention provides tangible search results using the dynamic interface that otherwise could not be achieved without the present invention. The tangible search results are determined and presented based on the dynamic contextual information, and other user selections, which change as the user makes various selections. The tangible search results are provided and displayed to the user in the content section of the dynamic contextual interface.

In some embodiments of the invention, the present invention receives a search from the user. The search may include search terms, keywords, phrases, filter selections, or the like.

In response to the search, the present invention determines the search results to display to the user in a contextual search interface based on the search. After the present invention determines the search results, the present invention displays the search results in a search results section of the contextual search interface. In some embodiments of the present invention, the search results comprise a list of the search results. In addition to displaying the search results, the present invention displays content in a content section of the contextual search interface. The content is for at least one of the search results from the search results section and the content section and the search results section are different sections from each other. After the search results have been determined and displayed, the present invention further determines dynamic contextual information based on the search from the user and the household profile information. In some embodiments, the dynamic contextual information comprises household profile information associated with the user. Based on determining the contextual information, the system is preconfigured to display the dynamic contextual information in a dynamic contextual information section of the contextual search interface. The dynamic contextual information section is different from the search results section and the content section. The system provides the user an ability to provide additional information along with the contextual information which is received by the present invention. The contextual information input comprises at least a selection of the household profile or household profile information within the household profile used to update the search. After receiving the contextual search information, the present invention determines updated search results, updated content, and updated dynamic contextual information based on the contextual information input from the user. Upon determining the updated search results, the present invention displays the updated search results in the search results section, the updated content in the content section, and the updated dynamic contextual information in the dynamic contextual information section.

In some embodiments of the invention, the household profile information comprises profile information for at least one individual other than the user. The household profile information includes roles for the individual user of the household profile. In some embodiments, the system may further determine the search results and the dynamic contextual information based on the role of the at least one individual.

In some embodiments of the present invention, the present invention may be further configured to receive a request from the user to edit the household profile, receive profile information for at least one individual of the household profile, update the household profile based on receiving the information for the at least one individual. In some embodiments, the information for the at least one individual may be supplied by the user. In other embodiments, the information for the at least one individual may be received from a third party as a result of the at least one individual supplying the third party with the information.

In some embodiments, the search results to display in the contextual search interface are based on the household profile of the user. In other embodiments, the present invention may be further configured to determine a portion of the household profile to use in determining the search results or the updated search results, or the dynamic contextual search or the updated dynamic contextual search. In such an embodiment, when the present invention determines the portion of the household profile to use, the present invention basis such a determination on the search received from the user.

In some embodiments of the invention, the dynamic contextual information and the updated dynamic contextual information change based on the search from the user. In other embodiments contextual information may further change based on the dynamic contextual input from the user, the search results selected by the user, and time the user spends on viewing the content in the content section.

In some embodiments, the at present invention may be configured to receive user profile information and upon receiving such information determining the search results or the updated search results is based in part on the user profile information. In addition, the present invention may further receive user account information, whereupon receiving such information enables the present invention to determine the search results or the updated search results based in part on the user account information.

In some embodiments of the present invention, the present invention may determine at least one of the search results selected by the user and determine the updated search results and the updated dynamic contextual information based on the at least one of the search results selected by the user.

In some embodiments, the present invention may determine that the user would like to communicate with an advisor based on the search or contextual information input from the user. Upon determining that the user would like to communicate with an advisor, the present invention may further identify favorite advisors of at least one individual in the household profile. This identification may be based on receiving reviews from the individuals of the household profile for the advisors. In other embodiments, the identification may also be based on the number of appointments an individual of the household profile has had with the advisors. Upon identifying the favorite advisors, the present invention may determine an advisor to present to the user based on identifying the favorite advisors. After determining the advisor, the present invention may then display the advisor to the user.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
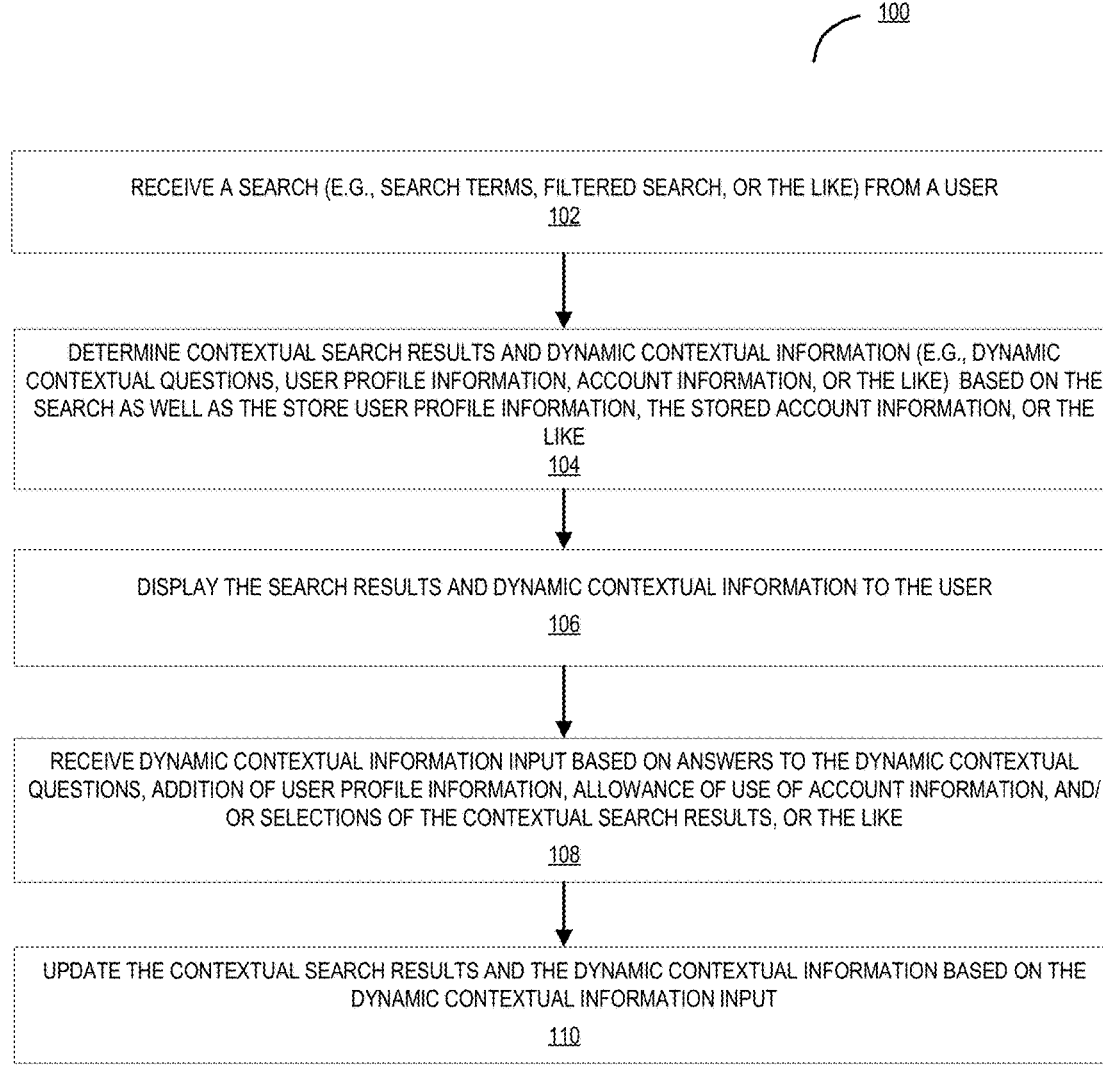
Figure 2:
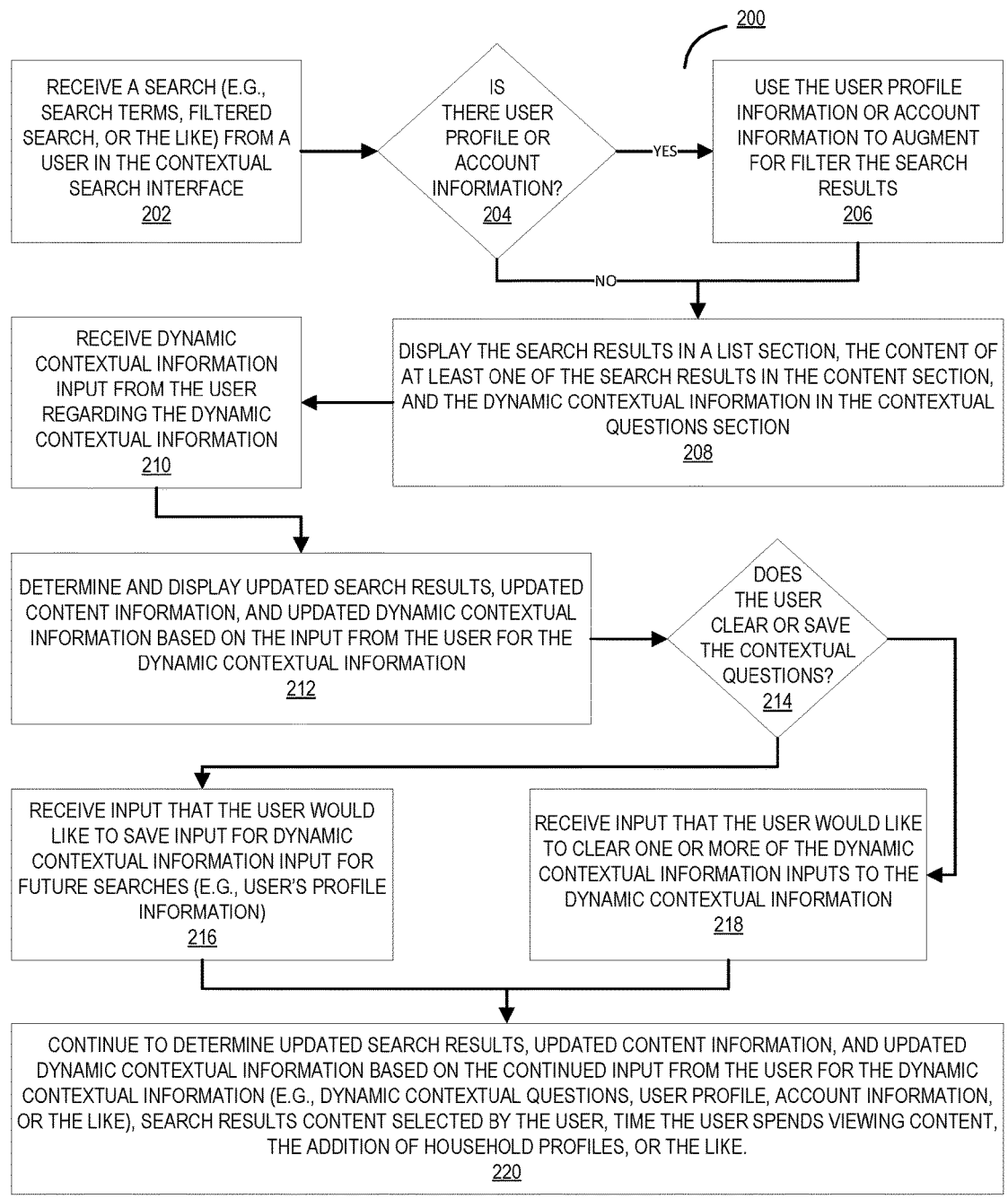
Figure 3:
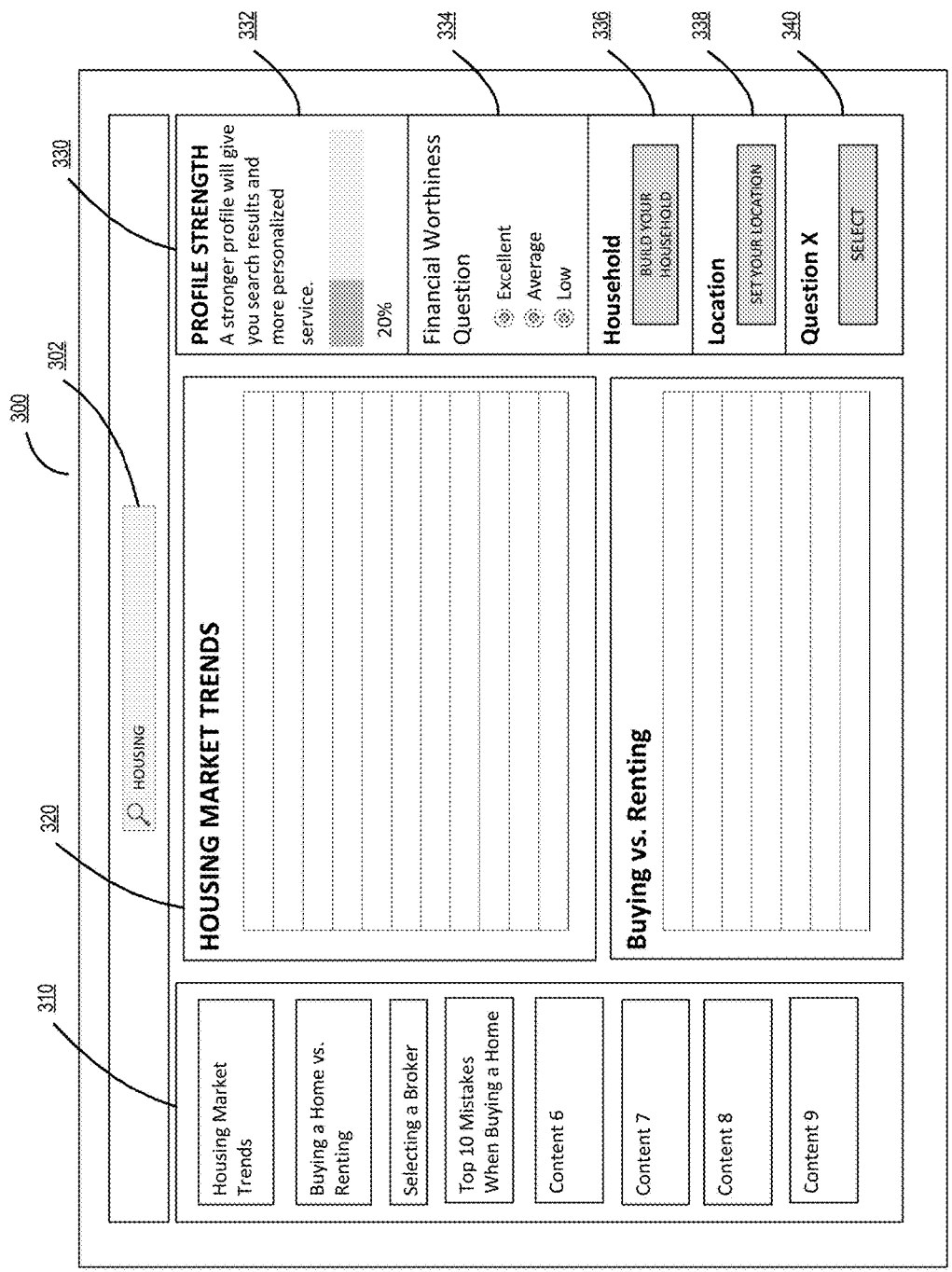
Figure 4:
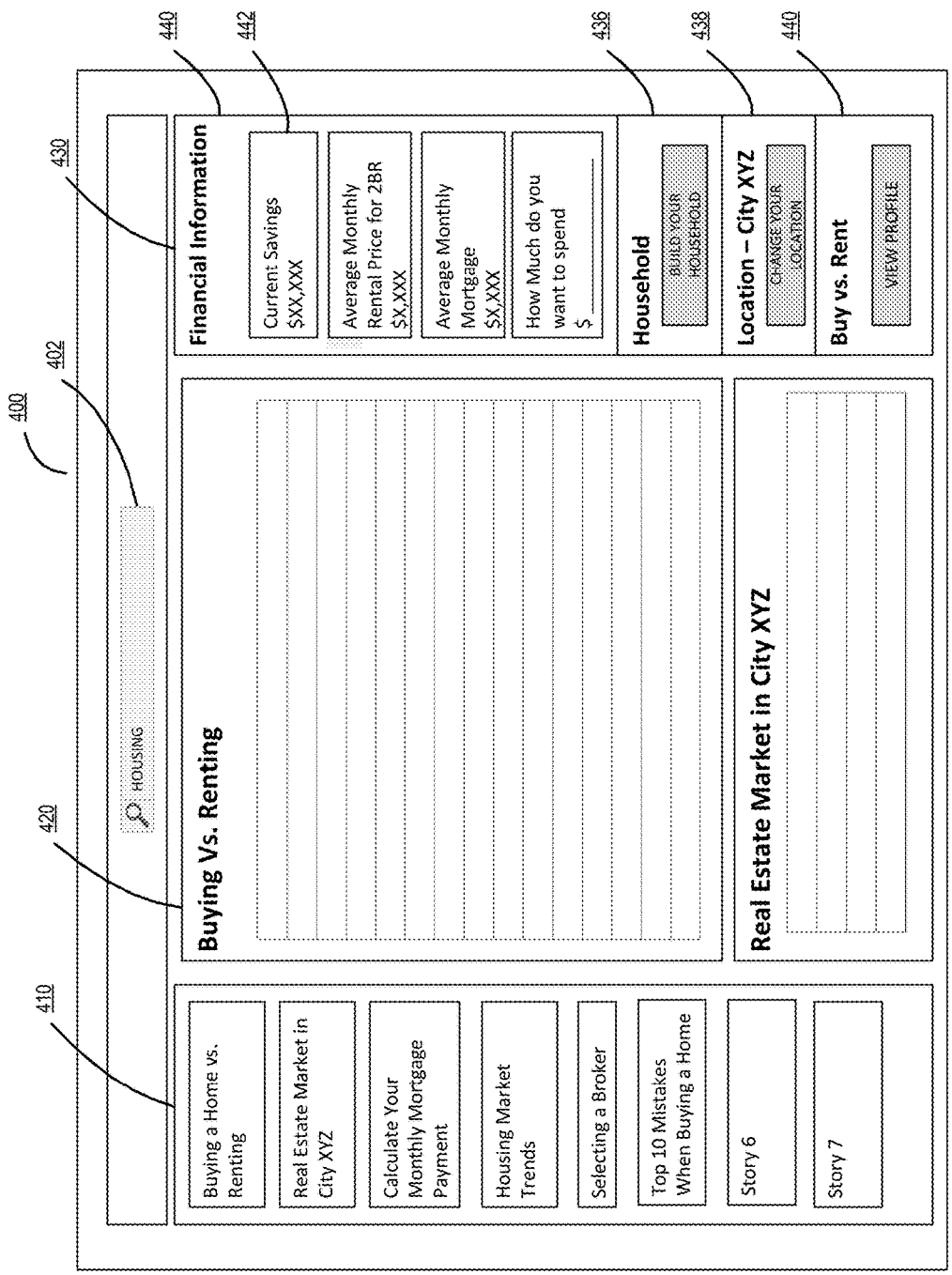
Figure 5:
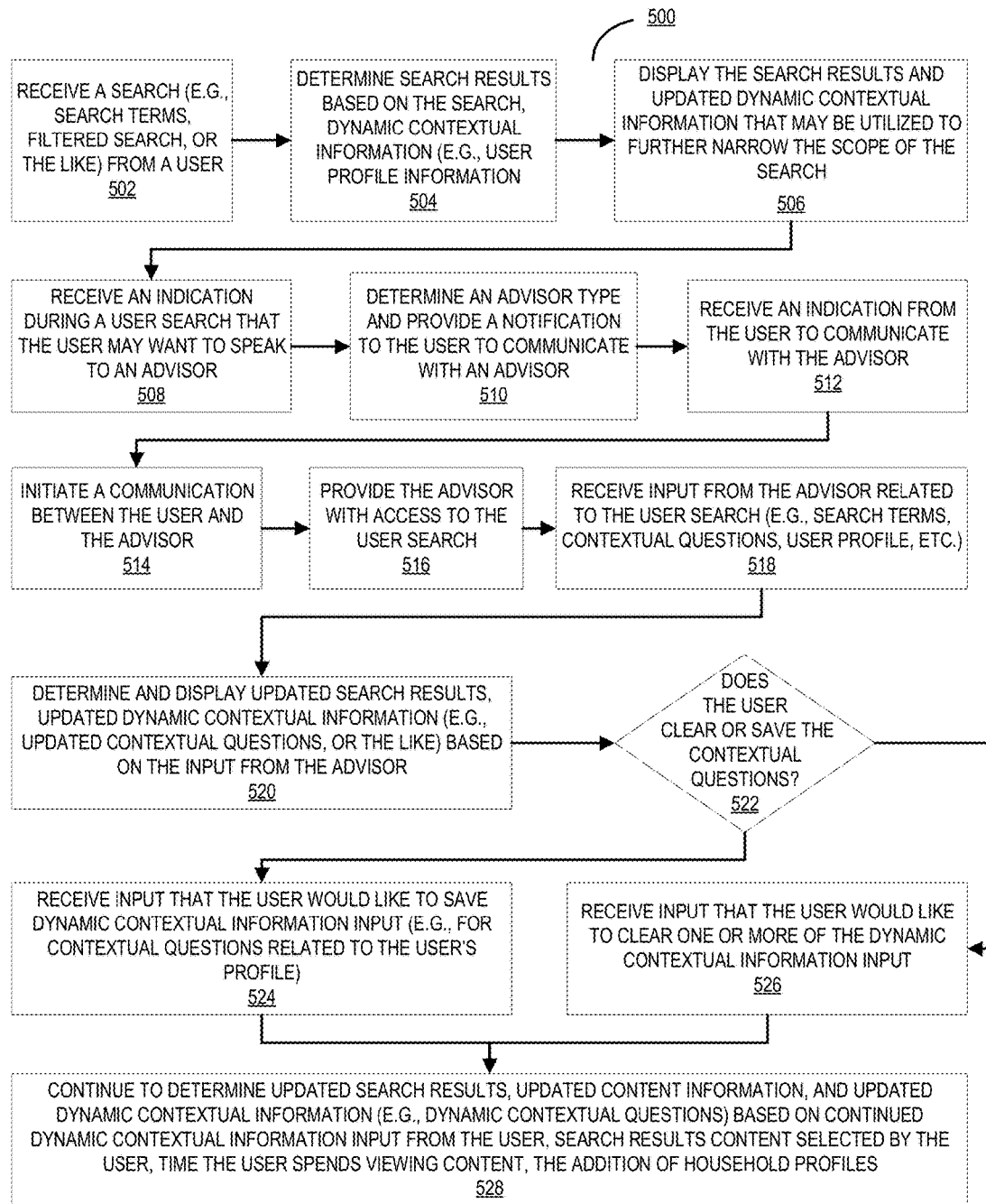
Figure 6:
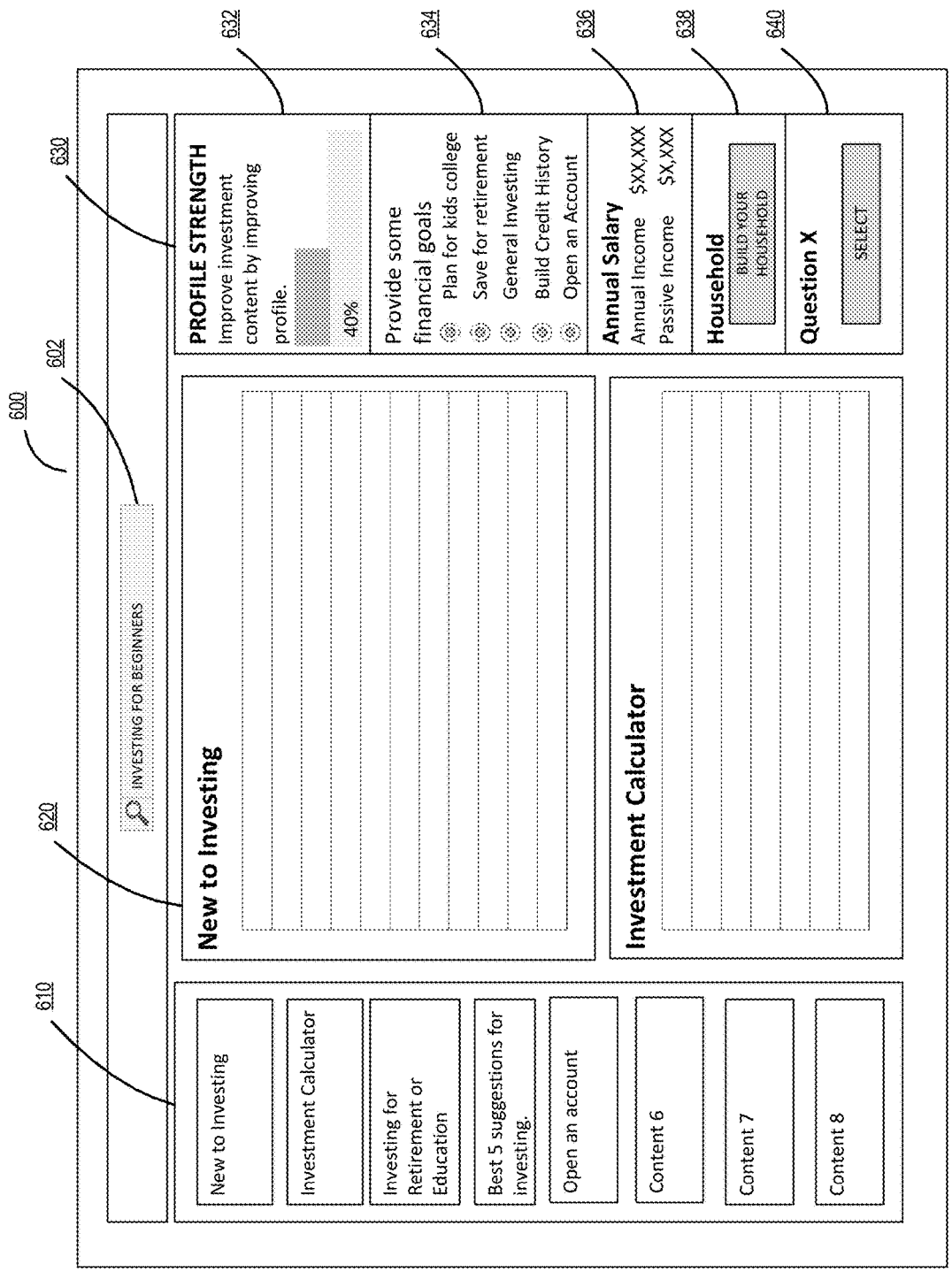
Figure 7:
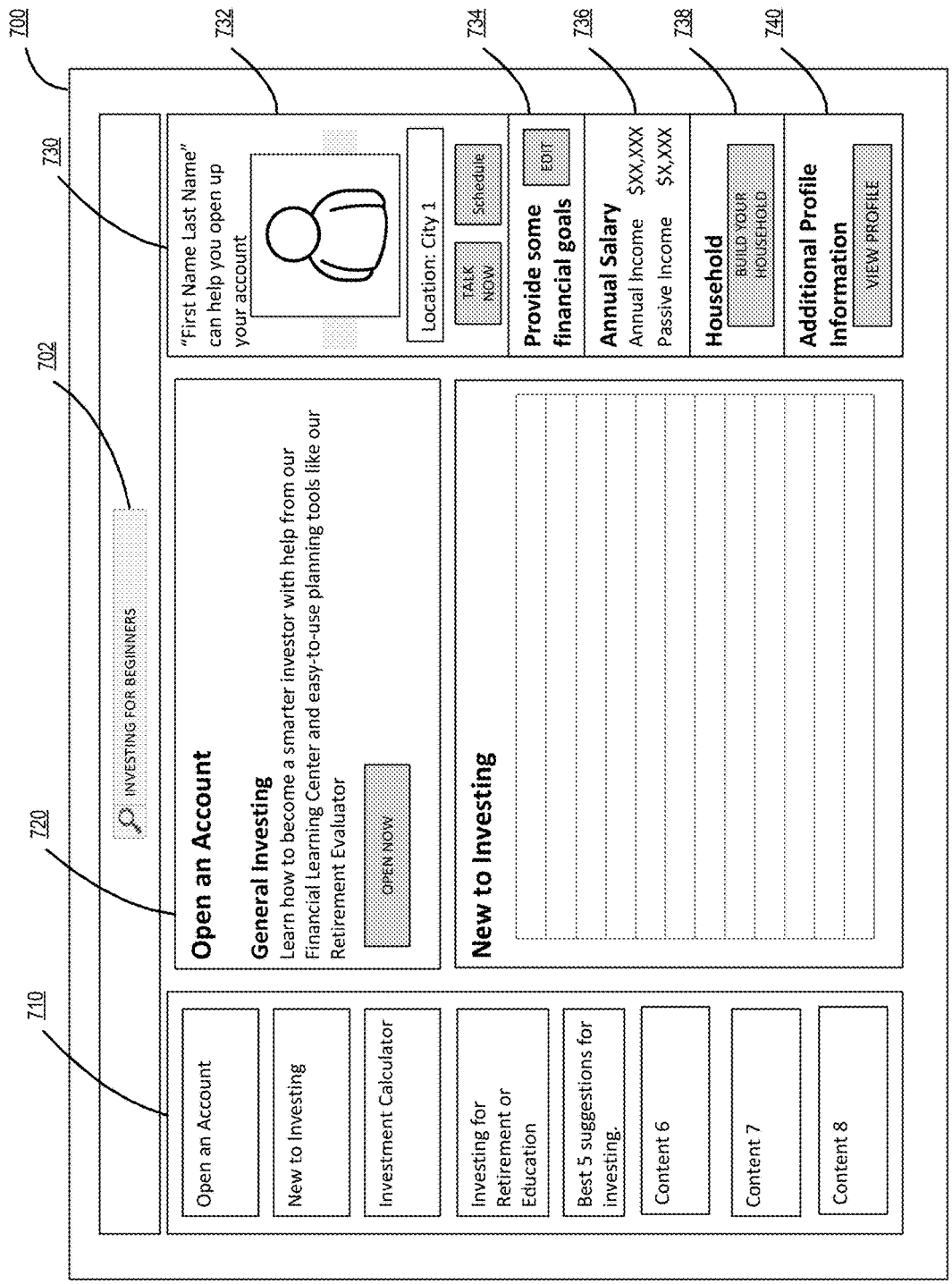
Figure 8:
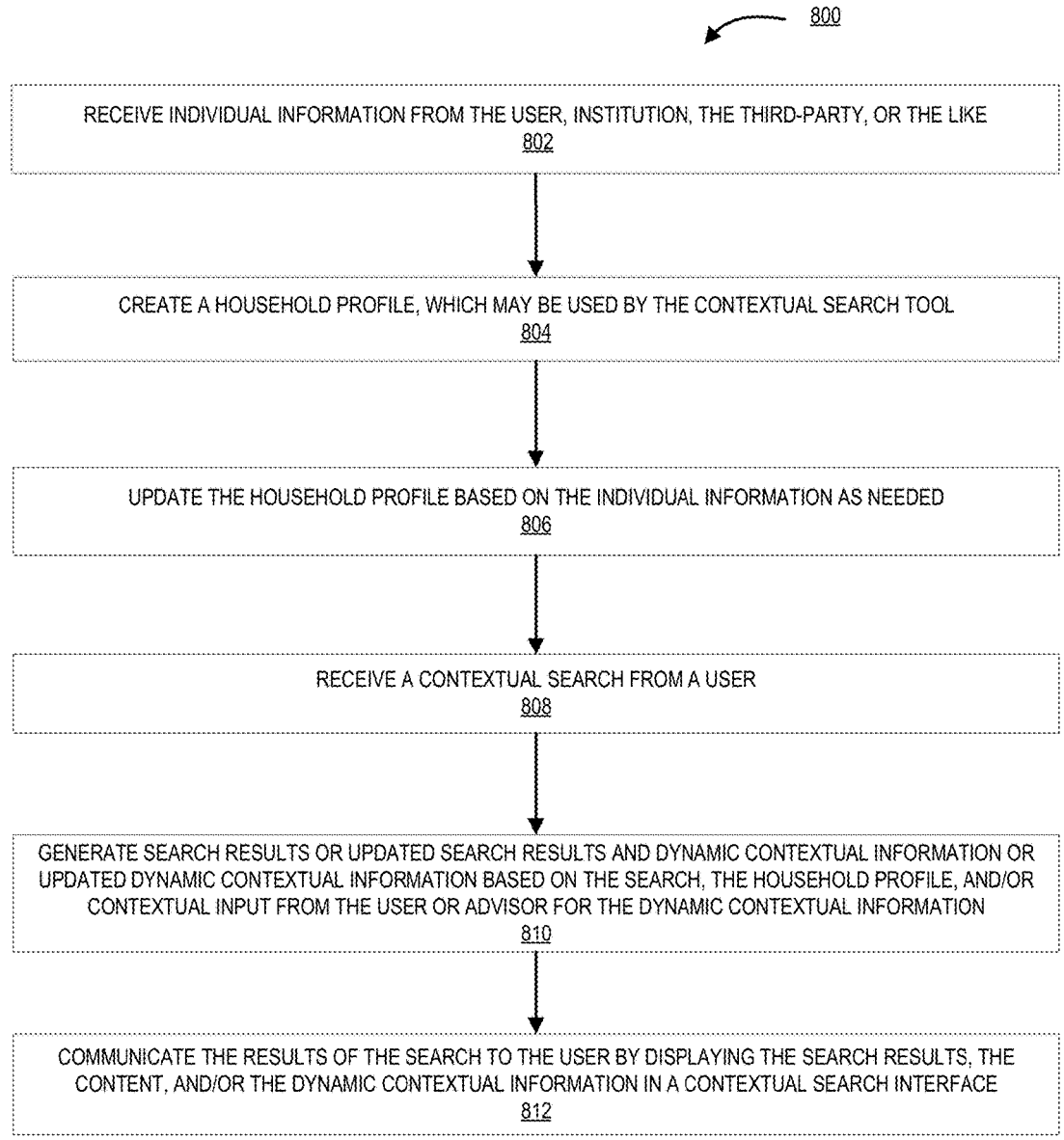
Figure 9:
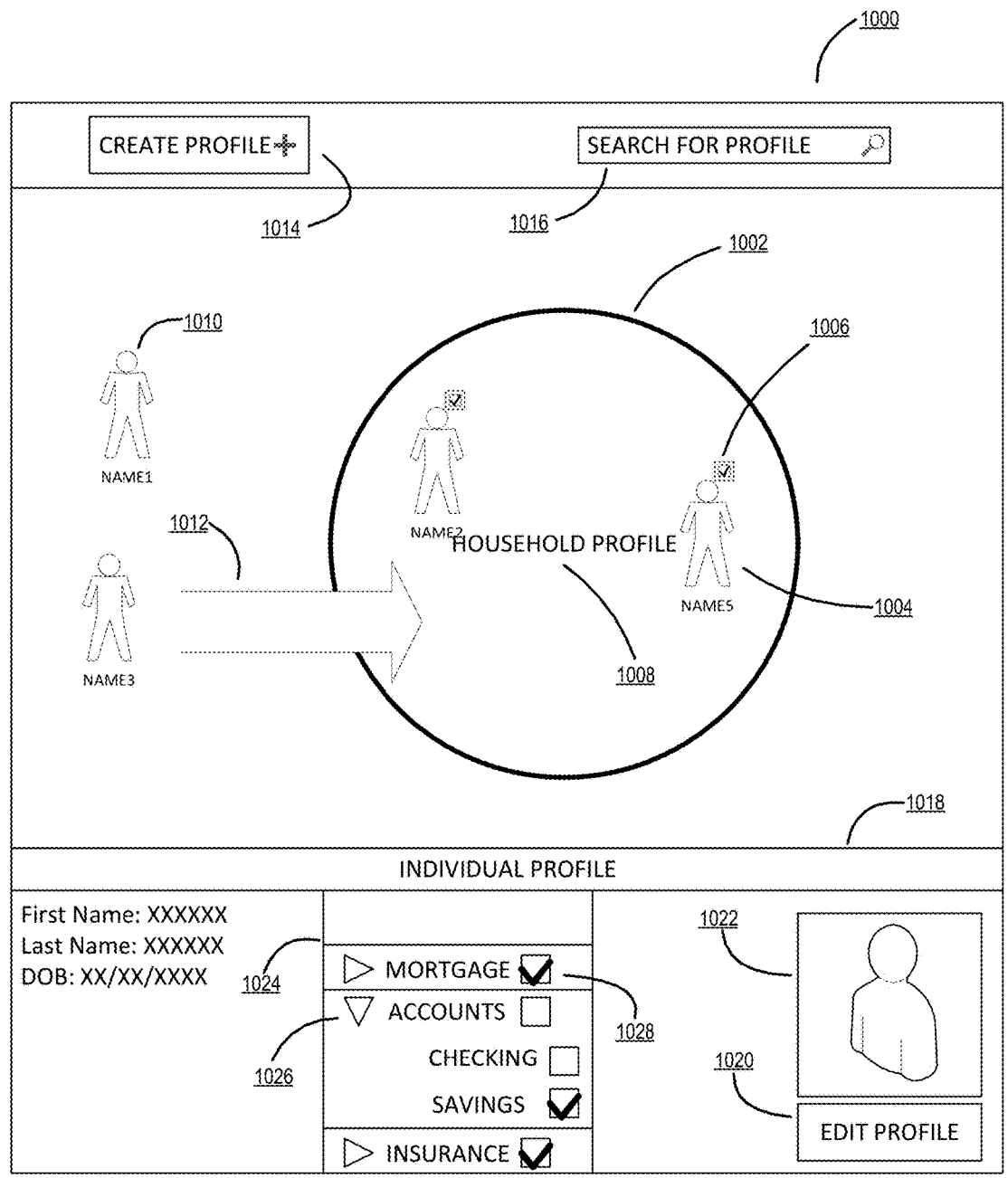
Figure 10:
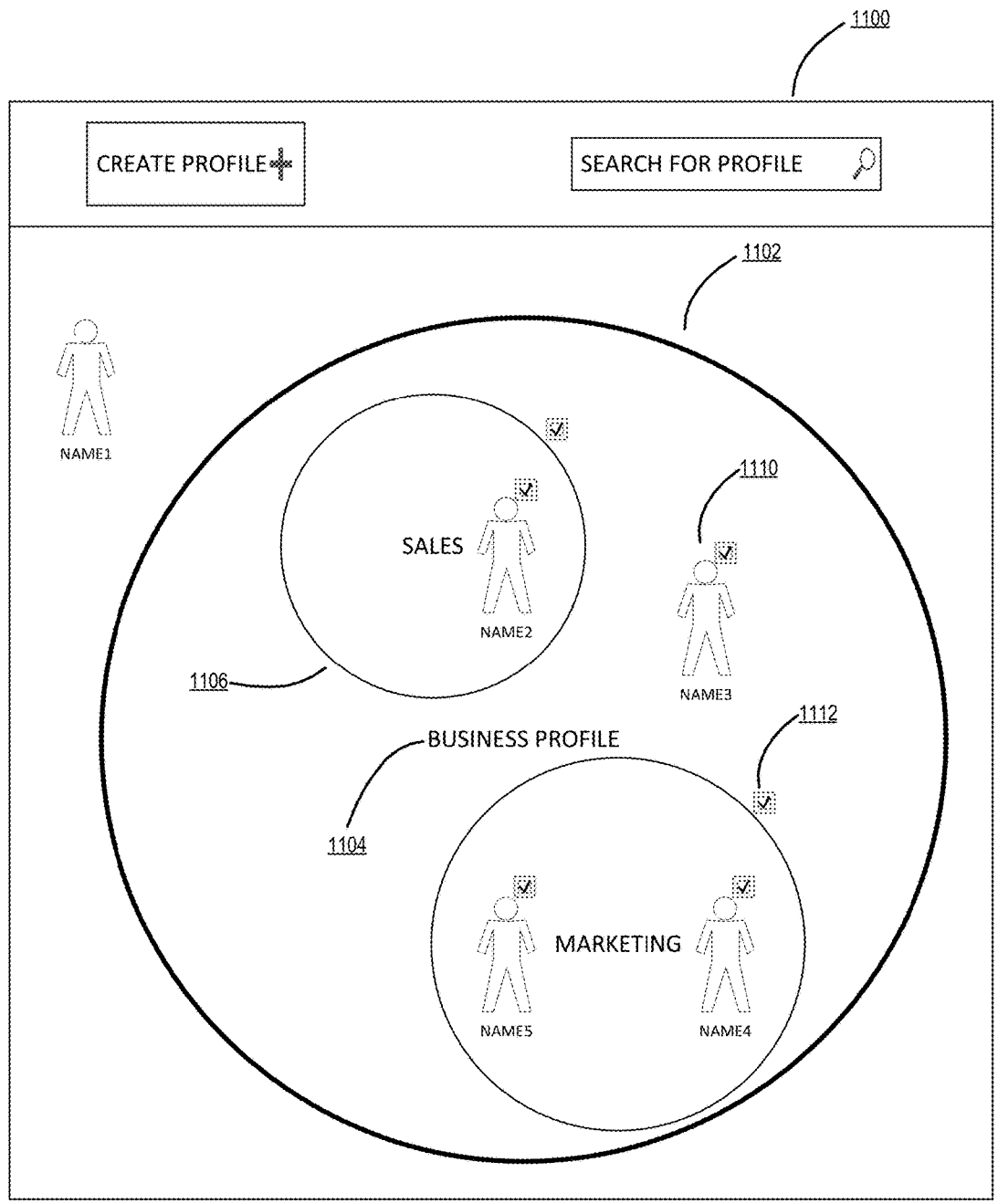
Figure 11:
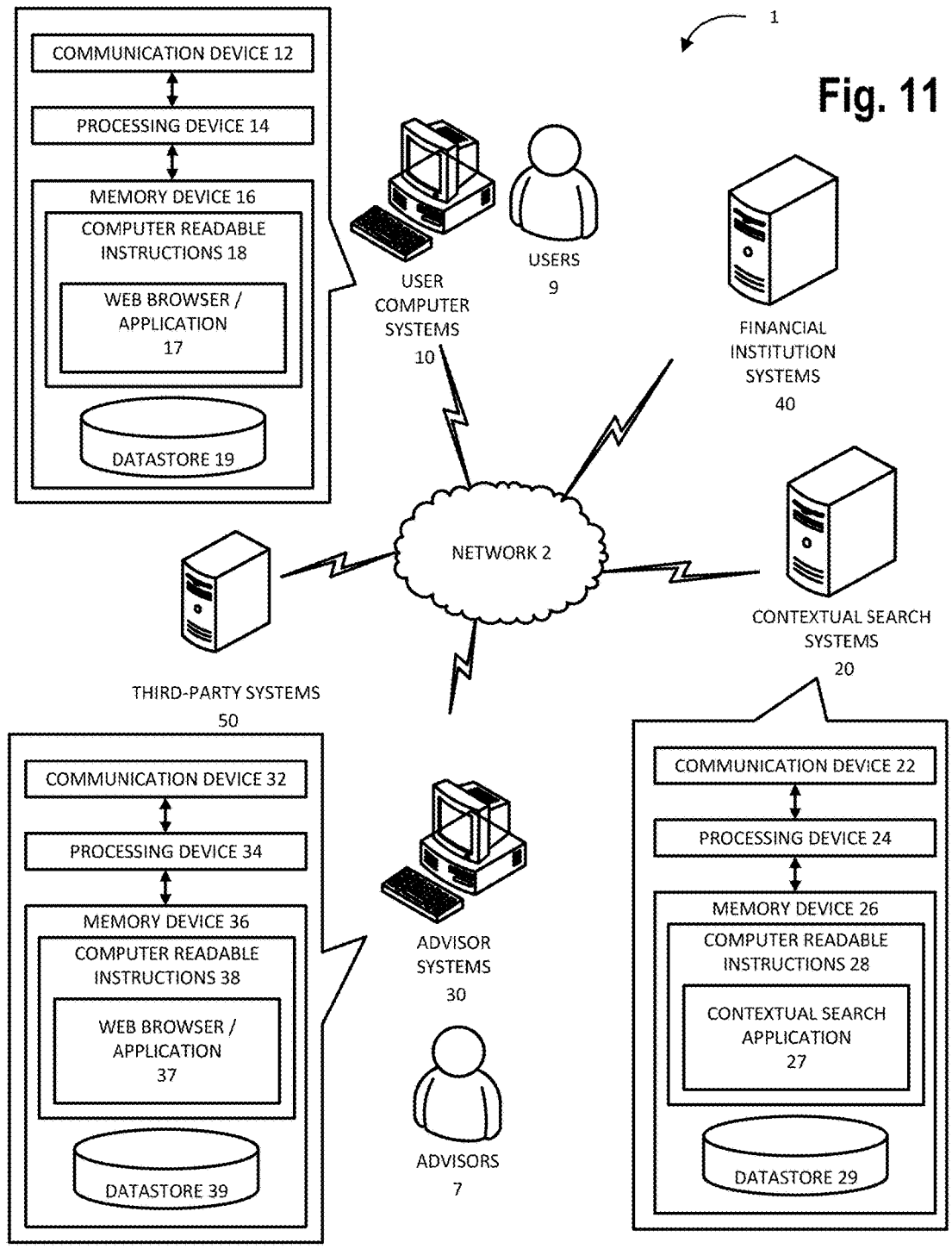

Having thus described embodiments of the invention in general terms, reference will now be made to the accompanying drawings, wherein:

FIG. 1 illustrates a high level process flow for a contextual search, in accordance with one embodiment of the present invention;

FIG. 2 illustrates a process flow for a contextual search, in accordance with one embodiment of the present invention;

FIG. 3 illustrates a contextual search interface, in accordance with one embodiment of the present invention;

FIG. 4 illustrates another contextual search, in accordance with one embodiment of the present invention;

FIG. 5 illustrates a process flow for a contextual search with advisor input, in accordance with one embodiment of the present invention;

FIG. 6 illustrates a contextual search interface, in accordance with one embodiment of the present invention;

FIG. 7 illustrates a contextual search interface with advisor input, in accordance with one embodiment of the present invention;

FIG. 8 illustrates a flow chart for a process for generating and communicating a response to a contextual search based on a household profile;

FIG. 9 illustrates a household profile interface for organizing and creating individual profiles within the household profile;

FIG. 10 illustrates a household profile interface for organizing and creating individual profiles and creating sub groups within the household profile; and FIG. 11 illustrates a block system diagram for a contextual search tool environment, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution" or "bank," one of ordinary skill in the art will appreciate that other embodiments of the invention may involve other businesses or institutions that take the place of or work in conjunction with the financial institution or bank to perform one or more of the processes or steps described herein as being performed by a financial institution or bank. Still in other embodiments of the invention the financial institution or bank described herein may be replaced with other types of businesses or institutions that offer account services to users.

FIG. 1 illustrates a high-level process flow for a contextual search process 100. As illustrated by block 102 the contextual search process 100 comprises receiving a search from a user 9. The search may include search terms, keywords, phrases, filter selections, or the like The contextual search may be made through an internet browser, through an application, or the like that allows the user 9 to search for topics and provide additional information to tailor the search results to the user 9. In some embodiments, the search may be performed through a search account, such as an e-mail account, online banking account, social media account, application account, or the like for which profile information or account information of the user may be utilized to tailor the search results to the user 9.

Block 104 of the contextual search process 100 illustrates that the contextual search tool of the present invention determines search results for the user 9 based on the search received from the user 9. In addition to determining the search results, the contextual search system also determines dynamic contextual information to present to the user to tailor the search results to the user 9. The dynamic contextual information may include dynamic contextual questions, user profile information, user account information, or the like. The dynamic contextual information that is determined may be based on the search terms received from the user, the user profile information (e.g., if the user profile information has been previously stored), the user account information (e.g., savings amount, investing amount, checking amount, transaction information for products or services), and/or the like.

As illustrated by block 106 of FIG. 1, the contextual search tool of the present invention displays the search results, the content from the search results, and/or the dynamic contextual information to the user 9 in a contextual search interface. These may be presented in a single section or multiple sections.

Block 108 of FIG. 1, illustrates that the contextual search tool receives contextual input from the user 9 regarding the dynamic contextual information (e.g., answers to the dynamic contextual questions, selection or input of user profile information, selection of particular account information to use the in search, or the like), information that may be automatically used by the contextual search tool (e.g., based on stored user profile information, stored account information, stored dynamic contextual question answers, or the like), information related to the content selections made by the user (e.g., links, stories, blogs, articles, or the like selected by the user from the search results), and/or input provided by an advisor 7 (e.g., mortgage, financial, account, loan, savings, or any other type of advisor within or outside of the banking industry) with which the user 9 is communicating. As will be discussed in further detail later as the system of the present invention receives the various types of information it updates the search results and the contextual questions and presents the updated information in the contextual search interface.

The dynamic contextual information of the present invention improves the accuracy, speed, and efficiency of the contextual search tool. The dynamic contextual information is updated in real-time or near real-time based on any changes the user makes to any of the sections in the contextual interface, or any changes to the user's profile or account information as the changes occur. As such, the aspects of the contextual search tool described below improve upon the search results of a user by augmenting the original search results with customized dynamic contextual information of the user 7. Without the use of the dynamic contextual information of the present invention a user's search is limited to the search terms provided by the user 9, which may or may not provide the desired search results. By allowing for the use of dynamic contextual information the contextual search tool may request information that would help improve the user's search, but the information used in the search is still determined and controlled, in part by the user 9 in real-time. As such, the contextual search tool or module thereof is specialized to take the search terms of the user 9 and identify not only initial search results, but dynamic contextual information that the user 9 may view and respond to in real-time to improve upon the search results. Moreover, the search results may be presented to the user 9 in a way to efficiently allows the user 9 view the search results, scroll through the content associated with the search results, and augment and improve upon the search results through the dynamic contextual information in a single interface.

FIG. 2 illustrates a process flow for a contextual search process 200, in accordance with one embodiment of the present invention. As illustrated by block 202 in FIG. 2, and as previously discussed with respect to block 102 in FIG. 1, the contextual search tool of the present invention receives a search from a user 9. As previously discussed the search may include search terms, keywords, phrases, filter selections, or the like. The search may be received through a web browser, crawler, application, or the like that identifies search results using an algorithm based on the inputted search. In some embodiments, of the invention the user may log into an account into order to perform the search. By logging into an account, the contextual search tool may utilize additional information related to user profile information or user account information to improve upon the search results. In one embodiment of the invention the user account may be an account the user has with a financial institution, such as but not limited to an online banking account application. For example, the user 9 may log into the user's online banking account, which may have user profile information about the user 9 and/or user account information. The user profile information may include information about the user 9, such as the user's age, income, address, financial wellness, interests, or the like as will be discussed in further detail later. The user account information may include the amount of funds in user accounts (e.g., checking, savings, investment accounts, or the like), transactions made by the user using the accounts (e.g., purchases, products, services, bill payments, or the like), dates, times, or locations where the accounts were opened or used, products or services purchased with the accounts, merchants or other customers with which the user has entered into transactions (e.g., made purchases, transferred money, or the like), or the like. The financial institutions of the users 9 may be in a particular beneficial position through which to perform the search because the financial institution often has user profile information and user account information, which may be used to augment or filter the user's search. In other embodiments of the invention, the search may be performed through other types of accounts, such as e-mail accounts, social media accounts, dedicated search accounts, merchant accounts, or the like.

As illustrated by decision block 204, after receiving the search from the user 9, the contextual search tool may determine if there is any user profile information or user account information associated with the user 9. As illustrated by block 206 if there is user profile information or user account information, then the user profile information or user account information is utilized to augment the search terms received from the user or the search results determined based on the search received from the user 9. For example, as illustrated by the contextual interface 300 of FIG. 3, the user 9 may have utilized a search field 302 in the interface to search the phrase "housing." As described above, search results for this search may be determined by the contextual search tool, such as one or more articles, videos, audio, blogs, interface links, or other like content related to the search terms. Either before the search results are determined by the contextual search tool and/or after the search results are determined the search results may be augmented and/or filtered based on the user profile information or the user account information. For example, when the contextual search tool receives the search terms "housing" the contextual search system may identify the amount of funds the user 9 has in the user accounts, the financial worthiness of the user 9, the age of the user, the location of the user, or the like. For example, the contextual search tool may identify that the user 9 is located in city XYZ (e.g., based on the location of the account or the location of transactions), that the user is XX years old (e.g., included in the user profile information), that the user 9 has XX,XXX in a savings account that could be utilize for a down payment on a house (e.g., from user account information), and that the user 9 has excellent credit worthiness (e.g., from stored user profile information). Based on this additional information the contextual search tool may modify the search terms or filter the search results (e.g., augment the search for "housing" or filter the search results found for the term "housing" to identify content developed for young homebuyers, with good credit worthiness, for city XYZ, for users with a similar net worth for savings, or the like). Moreover, in some embodiments, the contextual search tool may fill out content with the user profile information or user account information (e.g., fill out a mortgage calculator with the credit worthiness and/or savings amount for a down payment) in order to provide more customized search results for the user 9.

As illustrated by block 208, either after the determination that there was no user profile information or account information (e.g., block 204) or after the search results have been augmented or filtered (e.g., block 206) the contextual search results are displayed in a contextual search interface 300 as illustrated in FIG. 3. In one embodiment of the invention the contextual search interface 300 may include a search results section 310, a content section 320, and a dynamic contextual information section 330. As illustrated in FIG. 3, the search results section 310 may be located on the left side of the contextual interface 300 and include a list of the search results, which may or may not be augmented by user information or user profile information. The search results may be listed in the order as the most relevant to the search requested by the user and/or as augmented or filtered by the user information or the user account information. The content section 320 may include the content, or portions thereof of one or more of the search results, which illustrates the actual articles, videos, audio, text, blogs, or other content related to the each of the search results in the search results section 310. As illustrated in the content section 320 the content may be displayed in the order in which the search results are displayed in the search results section 310. The user 9 may scroll through the content section 320 and/or the search results section 310 and the content for each of the search results will be displayed in the content section 320.

The dynamic contextual information section 330 may include dynamic contextual information that is presented and/or changed, as discussed in further detail later based on contextual information input (e.g., user answers one of dynamic contextual questions, adds or updates the user profile information, allows the user of account information, or the like) from the user 9 (or advisor 7 as discussed in further detail later). As previously discussed, the dynamic contextual information may include information for the user 9 that when answered, selected, or otherwise allowed for use in the search, would tailor the search results from the user's search to the user 9. For example, as illustrated by the profile section 332, the dynamic contextual information section 330 may include an area in which the strength of the user's profile may be displayed (e.g., 20% complete) indicating that there is additional user profile information that the user may submit in order to provide additional information about the user 9 that would improve the search results for the user 9 (e.g., the user's age, location, interests, net worth, or the like). The user 9 may select the profile section 332 in order to provide additional profile information through another screen, pop-up, or within the profile section 332 itself. In another example, the dynamic contextual information section 330 may include a financial worthiness question section 334 in which the user 9 may provide additional information related to the credit history of the user 9. The credit history may provide additional information that may narrow the search results of the user 9 (e.g., low financial worthiness history may provide articles related to how to improve financial worthiness, or good financial worthiness history may provide articles related to utilize available loans). In another example, the dynamic contextual information section 330 may include a household section 336, in which the user 9 may provide information or answers to questions related to other members of the user's family, co-workers, or other households, which link the user's profile to profiles of other individuals (e.g., wife, child, co-worker, friend, or other like profile); link the household accounts to the user's account; link the favorite advisors of the household users to the user 9 of the present invention; such that when the user 9 searches for content the user profile information or account information of other members of the household may be utilize to augment or filter the contextual search results of the user's search. The household profiles will be described in further detail later. In still another example, the user 9 may also utilize a location section 338 in the dynamic contextual information section 330 in order to set/change the user's locations (e.g., a default location, temporary location, future location, past location, or the like). The location information may be utilized to tailor the search results to the user 9. In other embodiments of the invention other dynamic contextual information may displayed in various sections within the dynamic contextual information section 330 of the contextual interface 300. For example, in some embodiments the dynamic contextual information section 330 may include specific questions regarding the amount of money the user 9 has to spend, the products or services in which the user 9 is interested, financial goals of the user 9, other income streams of the user 9, or the like. In still other embodiments of the invention the dynamic contextual questions may be related to some of the initial search results, for example, if the user search "housing" the dynamic contextual questions may include an indication if the user is interested in buying or selling, buying or renting, condos, luxury or moderate homes, or the like. It should be understood why the illustrated embodiment relates to housing, the search results, and thus the dynamic contextual questions may be related to any type of topic.

As illustrated by block 210 of FIG. 2, the contextual search tool receives contextual input based on the user's actions. For example, the contextual input may be direct input, such as but not limited to answers to the dynamic contextual questions, the addition of user profile information, the user allowing the use of account information, or the like. However, the contextual input may comprise indirect input such as the search results selected (e.g., the links or articles selected) by the user 9 in the search results section 310, the amount of time the user 9 spends on a particular search result (e.g., time reading an article), changes in the user's account information (e.g., transactions that are associated with the user's account as the user shops), or the like.

As illustrated by block 212 the contextual search tool updates the search results and the dynamic contextual information based on the contextual input received from the user. For example, as illustrated by the contextual search interface 400 in FIG. 4, the user 9 may have selected on the buy vs. renting article link from FIG. 3, selected that the user 9 has excellent financial worthiness in the dynamic contextual information section 334, and selected city XYZ as the user's location. In response, the contextual search system may display the selected article first in the content section 420, but may update the search results in the search results section 410 and the dynamic contextual information in the dynamic contextual information section 430. For example, the search results section 410 may be updated with the more relevant tailored search results for the user 9 (e.g., an article about the real estate market in city XYZ, a mortgage calculator, articles for home buyers with excellent financial worthiness, or the like). In addition, the dynamic contextual information section 430 may be updated with additional dynamic contextual information that might provide additional information to further tailor the search results of the user 9. For example, in some embodiments the dynamic contextual information section 430 may ask the user 9 for input related to how much the user would like to spend on a monthly housing payment (e.g., mortgage payment, rent payment, or the like). The user's response to this question may further augment or filter the search results.

The dynamic contextual information sections 330 may also include contextual information that is for information purposes. For example, as illustrated information such as the average monthly rental price for specific types of housing may be displayed. In some embodiments, the user 9 may select on these information sections to further refine the search results. As such, by selecting on a particular type of information (e.g., average monthly rental payment for a 2 bedroom apartment) the contextual search system may infer that the user is interested in two bedroom apartments and further limit the scope of the contextual search results to content related to 2 bedroom apartments. In some embodiments, this type of information may appear in the search results section instead of the dynamic contextual results section.

Moreover, the dynamic contextual information section 430 may further include account information related to user, such that the user 9 has account information directly at hand when reviewing the search results. For example, the dynamic contextual information section 430 may include the user's current savings balance 442, checking balance, investment balance, or other like balances such that the user knows how much is available in the user's accounts for transactions while searching for content (e.g., for a down payment on a home). In some embodiments, of the invention, the user 9 may select the account information in order to allow the contextual search tool to utilize the account information to determine the search results. For example, the user 9 may allow the contextual search tool to identify that the user has $XX,XXX (in savings, and thus use this information to provide information related to loans the user may receive based on the user's savings balance.

The examples provided herein with respect to FIGS. 3 and 4, are illustrated as being related specifically to home buying or renting; however, it should be understood that in other embodiments of the invention the search terms, the search results, content, and/or the dynamic contextual information section may include any type of search terms, search results, content, and/or dynamic contextual information for augmenting or filtering the search results of the user 9 for any type of content.

Decision block 214 in FIG. 2 further illustrates that a determination may be made whether or not the user clears or saves the contextual input for the search results. In some embodiments the contextual input and specifically the answers to the dynamic contextual information may or may not be saved for use in follow up searches performed by the user 9. As illustrated by block 216, in one embodiment of the invention the user 9 may request that the contextual input related to the dynamic contextual information is saved by the contextual search tool for use in other content searches. For example, the user may determine to save information to the user profile related to the financial worthiness, the user's location, the user's age, average monthly salary, or any other type of dynamic contextual questions, user profile information, or user account information. As such, this type of information may be utilized whenever the user 9 performs additional content searches. The user 9 may be able to amend, change, add, or delete saved information as the user 9 desires by editing the dynamic contextual questions, the user profile information, or change access to the user of user account information. As illustrated by block 218 in FIG. 2, the user 9 may clear one or more of the dynamic contextual information, such that the contextual input for a current search made by the user 9 is not carried over to future searches.

Block 220 of FIG. 2 illustrates that the contextual search tool will continue to update the search results, the content, and the dynamic contextual information (e.g., including the dynamic contextual questions, or the like) based on any changes to the search terms, answers to the dynamic contextual questions, updated profile information, account information, the links that the user selects, the time the user spends on viewing specific content, household information, or any other information that may be displayed in the dynamical contextual information section 430.

FIG. 5 illustrates a process flow for a contextual search based on advisor input, in accordance with one embodiment of the present invention. Blocks 502 through 506 illustrate that a user 9 performs a search, a contextual search tool determines search results based on the search and/or dynamic contextual information, and the contextual search system displays the search results and dynamic contextual information to the user in a contextual search interface, as previously discussed with respect to blocks 102 to 108 in FIG. 1 and blocks 202 to 212 in FIG. 2.

Block 508 in FIG. 5 illustrates that the contextual search system receives an indication that the user 9 may like to speak to a representative (e.g., mortgage advisor, financial advisor, account advisor, investment advisor, or other like banking advisor within the financial institution, or another advisor outside of the financial institution). The indication may be based on a one or more factors, including but not limited to a determination that the user 9 is looking at content related to opening an mortgage, opening an investment account, seeking investment advice, the search terms of the user 9, or any other indication that user would like to speak to an advisor related to a business, such as a customer service advisor, a sales advisor, whether or not the advisor is or is not in the financial industry. For example, as illustrated in the contextual interface 600 in FIG. 6 the user may be searching for investments for beginners as illustrated by the search terms in the search field 602 illustrated the contextual interface 600 of FIG. 6. Like the other contextual interfaces previously described, the contextual interface 600 may include a search results section 610, a content section 620, and a dynamic contextual information section 630. As previously discussed with respect to the other contextual interfaces the search results section 610 may include articles, links, or other search results based on the search terms. Content related to one or more of the search results may be presented in the content section (e.g., an article related to new investors and an investment calculator). Moreover, dynamic contextual information may be presented to the user 9 in the dynamic contextual information section 630, such as profile questions 632, financial goals questions 634, income questions 636, household questions 638, and other questions 640. In another example, the user 9 may select on the search results related to opening an account in the search results section 610, which may provide an indication that the user 9 may want to speak to a user 9.

Once a determination is made that a user may want to speak with an advisor a determination is made as to what type of advisor the user 9 may want to speak to, as illustrated by block 510 in FIG. 5. For example, if the user is searching home buying or rental properties, the contextual search tool may identify that the user 9 wishes to speak to a mortgage advisor 7. As illustrated in another example in FIG. 6, the user 9 is searching for investment content for beginning investors, and as such, the contextual search tool may determine that the user 9 wishes to speak to an investment advisor 7. It should be understood that the present invention may be utilized for any type of business, and as such, any type of advisor may be determined that is within or outside of the business (e.g., marketing advisors, purchasing advisors, interior designer advisors, or the like) depending on what the user 9 is searching for and what institution has access to the user's search. Moreover, when the type of advisor 7 is identified an indication (e.g., notification, or the like) is presented to the user 9 in order to allow the user 9 to request to communicate with an advisor 7, as illustrated by block 510 in FIG. 5. As illustrated in FIG. 7, in one embodiment, after the user 9 selects the open an account search result link (e.g., in the search results section 610, 710, or otherwise provides another indication, the content section 620, 720 may change to display open account content, and the dynamic contextual information section 630, 730 may change to provide a suggestion to speak to an investment advisor 7 as illustrated in the advisor suggestion section 740 of the dynamic contextual information section 630. In other embodiments of the invention the suggestion to speak to an advisor 7 may be displayed in other locations, such as but not limited to a pop-up window, the content section 620, the search results section 610, another section within the interface or outside of the interface in another interface in another window.

As illustrated by block 512 the contextual search tool may receive an indication from the user 9 that the user 9 would like to communicate with an advisor 7. As illustrated in the contextual search interface 700, the user 7 may request to talk with an advisor now 742 or to schedule an appointment 744 with an advisor 7 in the future. Regardless of what option is selected in some embodiments of the invention the contextual search tool may identify potential advisors 7 based the location of the user 7, the advisors 7 the user 9 or the user's household has utilized in the past, the advisors 7 that are marked as a favorite by the user 9 or the user's household, or another method of determining the advisor to present to the user 9.

Either after the user 9 makes the request to speak to the advisor 7, or at a later point in time, the contextual search tool, or another system, may initiate a communication between the user 9 and the advisor 7. In some embodiments the communication may occur over a video conference, teleconference, chat, e-mail, instant message, or other like communication channel.

As illustrated by block 516 the contextual search tool may provide the advisor 7 with access to the user's contextual search (e.g., share the user interface with the advisor 7, provide the advisor with information related to the user's search, such as but not limited to the search terms, the search results, the dynamic contextual questions, the user information, the user account information, or the like). Accordingly, the advisor 7 is able to identify what the user 9 is searching for. Moreover, the advisor 7 is allowed to access the user's search in order to make changes to the user's search. For example, the user's interface (or a similar interface) may be presented to the advisor 7 on the advisors computer system. The advisor 7 may be able to drag and drop, upload, or otherwise provide information directly onto the user's interface. The user 9 may be able to see what the advisor 7 is doing in real-time or near real-time, but in other embodiments, the advisor 7 may actively make a selection to update the user's interface before the user 9 is able to view the search results, dynamic contextual information, or content to the user's screen.

Block 518 in FIG. 5 illustrates that the contextual search tool receives advisor input related to the user search. The advisor input may occur directly through the contextual search interfaces, or may occur on the back end of the system that may not be visual to the user 9. As such, the advisor 7 is able to change, for example augment, add, delete, modify, activate, deactivate, or the like the user's search terms, the search results in the search results sections, the dynamic contextual information (e.g., the contextual questions, user profile information, the account information, or the like), and/or the content in the content section. The advisor 7 may only make the changes to the search terms, the search results, the dynamic contextual information, and/or the content if user 9 agrees to allow the advisor 7 to make the changes.

As such in one embodiment of the invention, the advisor 7 may change the search terms of the user by adding or deleting keywords or phrases from the search fields. Since the advisor is an expert or specialist in the area in which the user 9 is interested (e.g., in the area in which the user 9 is searching) the advisor 7 may be in the best position to help the user 9 tailor the search terms to achieve the desired search results.

Moreover, the advisor may add content to the search results (e.g., in the search results section or directly to the content section). For example, the advisor 7 may know of an article, video, audio file, or other type of content that might interest the user 9, however, the content may not be available using a search of the Internet or Intranet, or may be hard to find. As such, the advisor 7 may be able to provide the content directly to the user 9. In some embodiments, the content may be linked or otherwise saved with the search performed by the user 9, such that if the user 9 uses the same or similar search again, the content provided by the advisor 7 will be included in the search results.

The advisor 7 may also provide, edit, or answer the dynamic contextual information. For example, during the conversation with the user 9 the advisor 7 may be able to identify information about the user 9, such as but not limited to user profile information, user account information, and/or the dynamic contextual questions that can be utilized to improve the search results requested by the user 9. As such, the advisor 7 may update or add user profile information to improve the search results. For example, the advisor 7 may update the user's age, income, address, financial wellness, interests, or the like to provide improved search results. The advisor 7 may also allow account information to be utilized to improve the search results. With the approval of the user 9, the advisor 7 may allow the contextual search tool to utilize the user's account information to tailor the search results to the user 9. For example, if the user 9 has a trading account in which the user 9 is allowed trade on margin or is otherwise recognized as an experienced trader because the user 9 has made a specific number of trades, has a balance above a specified level, has a particular amount of return over a time period, or the like, content related to more experienced traders may be presented to the user 9 (and less experienced investors may receive content related to new investors). Moreover, in other embodiments the advisor 7 may be able to add specific dynamic contextual questions to the dynamic contextual search section 730 that the advisor 7 thinks will improve the search results of the user 9, and the user 9 may decide whether or not to answer the dynamic contextual questions to improve the search results.

As such, the advisor 7 in the present invention may provide the contextual search tool additional input that the user 9 may not know how to use in a search, that the user 9 did not think about using in a search, or that the user 9 did not have access to in order to include in a search. The additional information added by the advisor 7 is added in real-time or near real-time as the user 9 is searching for results and/or is communicating with the advisor 7. The addition of the real-time or near real-time input from the advisor 7 improves the speed, accuracy, and efficiency at which the user 9 may identify information in the search results that actually covers what the user 9 is looking for.

Blocks 522 to 528 are the same as previously discussed with respect to blocks 214 to 220 in FIG. 2. As such, the user 9 may or may not decide to save the dynamic contextual information added by the advisor 7 for future searches. Moreover, as illustrated by block 528 the search results, content, and/or the dynamic contextual information are updated as the user 9 or the advisor 7 update the dynamic contextual information or the search terms, take other actions as previously discussed with respect to the search results and/or the content associated with the search results.

In other embodiments of the invention, the user 9 may only allow the advisor 7 to see specific information with respect to the user 9 and/or the user's search. For example, the user 9 may want not want to present information related to the user's family (e.g., has three kids), the user's profile (e.g., interests of the user 9), the user's account information (e.g., savings and investments with other banks), or dynamic contextual information (e.g., locations where the user 9 is looking to live) to the advisor 7, but the user 9 may want to include this information in the contextual search. As such, in some embodiments of the invention the user 9 may be able to allow this information to be included in the search results (e.g., the algorithm or the software may use the information), but prevent the advisor 7 from seeing the information. The user 9 may still use the advisor 7 to continue to provide input to the contextual search results while shielding the advisor 7 from sensitive information that the user 9 does not what the advisor 7 to have access to.

In other embodiments of the invention, the user's search results, content, and dynamic contextual information may be time stamped, saved, and stored such that the user 7 and/or the advisor 9 may revisit the searches in the future. In one embodiment, the search may be dumped into an interface which the user 9 can access to see what was used within a specific search. For example, the keywords used, the search results, the content, and the dynamic contextual search information used during the user search may be saved and accessed at a later point in time. The user 9 may request to save specific searches or the contextual search tool may automatically save the user's searches. The user 9 may return to the searches in the future in order to re-run the searches with specific dynamic contextual search information turned on or turned off, or with the addition of new contextual search information that has changed. For example, the user 9 may rerun an old search, but include additional account information related to additional funds that the user may have, while turning off information related to the number of kids the user may have, or the like. In other embodiments of the invention the user 9 may access the saved search in order to pick additional information to add to a current search, such as drag and dropping old search terms, search results, content, and dynamic contextual information into a new search to improve the search results of the user's current search.

As previously disused above household profile information may also be utilized to determine search results or dynamic contextual information. As defined herein, a household profile shall refer to a collection of information related to individuals, wherein the individuals have a relation to one another (e.g., a group of users, or a group with one user and one or more associated individuals). In some embodiments, part of the information that makes up the household profile may be structured using individual profiles (e.g., the same as or similar to the user profiles previously discussed). In such an embodiment, the individual profiles are grouped together to form at least a portion of the household profile. Other parts of the household profile may describe the household and not necessarily the individuals within profile. For example, a household profile may be setup to describe a family. The household profile may comprise of information related to each individual member of the family, as well information related to the family as a unit.

In some embodiments the user 9 for which the household profile is created may include the user profile of the user for which the household is created, and the user's profile may be linked to other profiles of other individuals who are not users (e.g., not customers of the institution, such as the financial institution, or the like). Where the household profile includes links to an individual who is not a user, a user 9 may submit information regarding the individual's profile (e.g., in some embodiments the user creates the individual and populates the profile for the user. In other embodiments, the individual who is not a user 9 may be given access in order to submit information on behalf of him or her. In still other embodiments, when the individual is a user 9 (e.g., second user), the individual may already have a user profile stored, and may edit and/or update the second user profile information to the first user's household profile. While in other embodiments, the individual information may be received as a result of information submitted through a third-party.

The relationship between the individuals may also be stored in the household profile, and may be a result of a familial or living relationship, or other like relationship. For example, a household profile may comprise a first individual (e.g., a user 9 as previously described herein) who is a parent and a second individual who is a child of the parent (e.g., not a user 9). In another example, the first and second individuals may be spouses (e.g., both may be users 9 as described herein). In other embodiments, the relationships within a household profile may be a result of a business relationship, such as an employer/employee relationship, a partnership, customer, or the like. In yet further embodiments, the relationship may be any other relationship decided between the individuals.

In some embodiments, an individual in the household profile may comprise multiple relationships. For example, a household profile may be for a business and the household profile comprises multiple individuals. One of the individuals may have a relationship with other individuals of the household profile such as manager, and may have a relationship with other individuals of the household profile such as employee, associate, subordinate, or the like.

In some embodiments, an individual profile of the household profile may further include a role of the individual within the household profile. A role may be used to describe a position in the household profile. For example, where the household profile describes a family and comprises multiple individuals, at least one individual may have a role of parent and another of child. In another example, in a business setting, an individual may have a role of treasurer. Similar to relationships, an individual may have multiple roles within a household profile. For example, in a business setting, an individual may be both a treasurer and an employee.

Where individual profiles comprise roles, in some embodiments, the roles may be hierarchal in nature, wherein a role may encompass other roles. For example, a role for manager may comprise the role of an employee. Further, in other embodiments, hierarchal order may define that one role refers to other roles even if the roles are not encompassed with the parent role. For example, an individual may have a role as manager and other individuals within the household profile may be assigned roles of workers. In this example, the role of manager does not encompass the role of worker. Yet, the role of manager may refer to the roles of workers based on the relationship of the manager to the workers. Such hierarchal roles may be defined to meet the needs of the household profile. In some embodiments, multiple individuals may have the same role. In other embodiments, the roles may be exclusive to one individual within the household profile.

FIG. 8 illustrates another embodiment of the invention in a process flow. FIG. 8, illustrates a process 800 for setting up household profile and performing a contextual search based on utilizing the household profile. In one embodiment, a user 9 may set up a household or edit a household by selecting the household section 336, 436, 638, 736 of the dynamic contextual information section 330, 430, 630, 730 of the contextual interface 300, 400, 600, 700. A household interface may be presented that allows the user 9 to enter or select information related to creating or editing household information that may be utilized in tailoring the search results for the user 9.

As illustrated by block 802, the process 800 comprises receiving information related to an individual to include in the household profile of the user 9. The individual information received for the individual may be the same as or similar to information that was previously discussed with respect to the user profile information. In some embodiments, as previously discussed the individual is also a user 9 (e.g., user that has an account with the institution) and receiving the information may be a result of the user 9 (e.g., a first user 9 setting up the household) submitting information on behalf of the second user 9 or receiving information automatically from the institution. In other embodiments, the individual being added to the household is not a user 9, and the information is received as a result of the user 9 (e.g., first user) submitting information on behalf of the individual, including but not limited to who the user is, the relationship to the user, the role of the user, or the like. For example, the household profile of the user 9 may describe a family and one of the members of the family may be a child who is not a user 9 (e.g., not an account holder with the institution). A second member of the family may be a parent of the child, and may also be a user 9 (e.g., second user 9 that has an account with the institution). The first user 9 (e.g., parent) may enter information on behalf of the child which results in the household profile of the first user 9 being updated with the information the parent submitted about the child. For example, the first user's profile may include that the first user 9 has a child of a certain age, the child is interested in attending college, the type of college, the associated cost of the college, that the child is interested in specific events or activities, or the like. This type of information in the household profile may be utilized by the contextual search tool to provide tailored results to the user 9 based in part on the information about the child. In other embodiments of the invention, the other parent (e.g., the second user 9) may be added to the household of the first user 9, and the first user 9 may enter or edit information about the second user 9 as previously discussed with respect to adding information about the child. However, in other embodiments the second user 9 may already have user profile information, account information, or like stored within the second user's 9 own account. As such, the information about the second user 9 (e.g., user profile information, or the like) may be added to, or shared with, the household profile of the first user 9 automatically, if agreed to by the second user 9. As such, in one embodiment a financial institution may allow for the sharing of user profiles and/or account information between first and second consenting users in order to create the household profiles.

In other embodiments of the invention, if the individual (e.g., the parent) is not a user 9, then individual may submit information on behalf of himself or herself using various methods. For example, the individual (e.g., second user 9) may be granted limited access to the household section associated with the first user 9 in order to submit information about the individual to the first user's household profile. Additionally or alternatively, the individual may submit information to, or store the information with a third-party which transfers the information to the household profile of the first user 9.

Block 804 of the process 800, illustrates creating the household profile. Creating the household profile may be performed automatically after the user 9 either inputs information about an individual, or after information about the individual is received by the household profile of the contextual search tool, as previously discussed with respect to block 802. In other embodiments, the household profile is created at the request of the user 9 (e.g., the first user 9). For example, the first user 9 may select to create the household profile with all of the individuals for which information was received, or only for the individuals that the user 9 wants associated with the household. Moreover, the user 9 may only request that certain information about the individual within the household be used in determining the search results or the dynamic contextual information that is created in response to a user search. For example, the parent may request that only the child's age and that the child wants to attend college in State 1 may be used determine the search results or dynamic contextual information, while other information may remain in the household profile, but not be utilized in the search. The user may be able to select the household information with the household section of the contextual search interface and/or within the dynamic contextual information section of the contextual search interface.

In some embodiments of the invention, the household profiles for a user 9 may include individuals within different households. For example, the user 9 may be part a first household (e.g., a family household) and a second household (e.g., employer household). As such, information for individual within these household may be different for different households for which the user 9 is a member (e.g., individual). As such, in some embodiments when joining a household or being part of a household only the information about the user 9 that relates to the household may be shared between members of the household. For example, if the user 9 is both a part of a family household and an employee household only the information about the user 9 related to the family is shared in the family household, while only the information about the user 9 related to the employee is shared in the employee household. As such, updating the household profile of a user 9 or individuals within a household profile of the user 9 may be limited to information that is shared between individuals of the specific households.

As illustrated by block 806, the household profile of the user 9 may be edited or changed at any point in order to add, delete, or edit information about the individuals in the user's household profile and/or what information in the household profile may be utilized by the contextual search tool in determining search results or dynamic contextual information.

As illustrated by block 808, the process 800 receives a search from a user 9 using the contextual search tool, as previously discussed with respect to block 101 of FIG. 1, block 202 of FIG. 2, block 502 of FIG. 5.

Block 810 of the process 800 generates search results and dynamic contextual information based on the search as previously described with respect to block 104 of FIG. 1, blocks 204 to 208 of FIG. 2, and block 504 of FIG. 5. However, the search requested by the user 9 may either be augmented using the household profile of the user 9, or the search results may be filtered using the household profile of the user 9, in order to provide search results and/or dynamic contextual information that are more tailored to the user 9. For example, if the user 9 is searching for colleges, the contextual search tool may identify the household profile related to the user's family (e.g., by identifying the relationships or roles of the individuals within the household profiles) and use information related to the user 9 having a child approaching the age of a college student, as well as the location in which the child wants to attend college in determining the search results. As such, the search results and the dynamic contextual information identified for presentation to the user 9 may be tailored to information regarding when the child of the user 9 will be attending college and locations in which the child wants to attend. Without the household profile information the search related to collages would be broadly tailored to colleges in general, and would not include the specific information related to what the user 9 was actually interested in (e.g., college information for his/her child). It should be understood that this is just an example and any other information that may be included in the household profile may be utilized by the contextual search tool to determine the search results and dynamic contextual information to present to the user 9.

In some embodiments of the invention, the contextual search tool determines whether or not to include household profile information in the search result. In some embodiments, the system may receive, from the user 9, an indication on whether to include household profile information in the search results (e.g., a selection of the information from the dynamic contextual information section). In other embodiments, the contextual search tool may determine whether to include household profile information automatically. The contextual search tool may accomplish this by determining the type of information the household profile contains against the type of information for which the user 9 is searching. The contextual search tool may accomplish this by comparing the terms used within the contextual search against the information included in the household profiles. For example, a user 9 with a household profile that comprises multiple individual profiles may perform a search with keywords "loan" and "automobile". The individual profiles within the household may indicate that one or more of the individuals are interested in loans but not automobiles. As such, the system may determine not to use the household profile to augment the search results. Alternatively, if the interests of one or more individuals includes an indication that the individuals are interested in automobile loans then the contextual search tool may include information about the individual in the search results, such as the individuals location, age, credit worthiness, savings (e.g., to determine what the individual can afford), or the like.

In the event that household profile information should not be included in the search result the contextual search tool generates search results and dynamic contextual information without the use of the household profile information (or portions thereof). As previously discussed above, the user 9 may decide whether to include the household profile as a basis for the system generating a search result. If the user chooses not to have the contextual search tool use the household profile information in generating the search result, the contextual search tool will generate the result without at least some of the household profile information. This may provide the user 9 with search results that are specific to the needs of the user 9 and not the household. For example, a household profile comprises a first individual and a second individual. The second individual profile comprises information related to a goal to buy a car. The first individual submits a contextual search related to a "loan." If the first individual included a selection to receive results based on the household profile, the system may generate a response including loans for automobiles. Conversely, if the first individual desired to not receive results based on the household profile, the system may generate a broader result that included home loans or other types of loans.

In embodiments where individual profiles within the household profile comprise a role, the system may generate a response based on a role of an individual. For example, where a household profile comprises a first user with a role of parent, and a second individual with a role of child, if the system receives a contextual search, the system may generate a response based on the second individual's role as a child. Specifically, for example, if the first individual submitted a contextual search with a keyword of "education," the contextual search tool may generate a response for education savings plans for children based on the household profile information related to the child. Without the household profile information, the search results may have instead been related to education information related to the parent.

In other embodiments, the contextual search tool may prompt the user 9 to determine the search results based on the household profile. In one embodiment, filtering the information from the household profile may comprise filtering based on information related to specific individuals of the household profile. For example, a household profile comprises a first individual (e.g., the user 9 performing the search), a second individual, and a third individual. The system may generate a response based on the first individual submitting a search and directing the system to only generate results based on information related to the first and the second individuals, only the second and third individuals, or only the second individual or third individual independently. As such, the user 9 may direct the search results to only the people in the household for which the user 9 is searching. For example, the user 9 may specifically request that the information about him or her not be used on the search.

As illustrated in block 812, the process 800 communicates the results to the user 9 by displaying the search results and the dynamic contextual information to the user 9 in the contextual search interface, as previously discussed with respect to block 106 of FIG. 1, block 208 of FIG. 2, and block 506 of FIG. 5.

In some embodiments of the invention, as previously discussed with respect to FIGS. 5-7, the user 9 may be interested in communicating with an advisor 7. As such, the household profiles may also be helpful in determining with which advisor 7 the user 9 may want to communicate. For example, in some embodiments of the invention the household profiles may include the advisors 7 with which the individuals in the household profiles have worked with in the past. In addition, the individuals may have indicated that one or more of the advisors 7 are favorites or otherwise highly rated by the individuals in the household (or poorly rated in other embodiments). As such, when the contextual search tool identifies that the user 9 may be interested is communicating with an advisor 7 (as previously discussed with respect to FIG. 5) the contextual search tool may access the household profile (e.g., the household profiles that the user 9 has allowed the contextual search tool to access) in order to identify suggested advisors 7 for the user 9. For example, the contextual search tool may identify that the user 9 is in need of a financial advisor 7 or mortgage advisor 7, and as such the household profile may identify financial advisors 7 and/or mortgage advisors 7 that have worked with the individuals in the household profile. As such, in some embodiments the contextual search tool may provide indications of the advisors 7 to the user 9 to communicate with the advisors 7 that have worked with the individuals in the past. Moreover, in some embodiments the indication provided to the user 9 may include the individuals with which the advisors 7 have worked and how the advisors 7 were rated by those individuals. The present invention improves upon the ability of the individuals within the household profile to share and communicate information between them related to advisors 7 with which the individuals have worked, and thus to provide more tailored search results to the user 9 related to content and/or advisors 7 in which the user 9 may be interested.

It should also be noted that in some embodiments of the invention, when a user 9 creates a household with individuals that are also users 9 with accounts with the institution, the household profiles may automatically, or based on approval from the individual users, be set up between each of the individuals within the household profiles. For example, when a first user 9 sets up a household profile that includes a second user 9, not only will the first user 9 have a household profile that includes the second user 9, but a household profile including the first user 9 may be set up in the account of the second user 9.

In accordance with block 804 of the process 800, a household profile is generated may be generated user various types of interfaces. FIG. 9 illustrates a household profile interface 1000 for organizing and adding individual profiles to the household profile. The household profile interface 1000 allows a user 9 to interact with the household profile in order to organize and specify which profiles the user 9 would be interested in for generating search results. The household profile may be represented by element 1002 as a bubble. The household profile may be represented by any other type of object, which performs the function of enclosing and showing separation or otherwise allowing a user 9 to create a household. Located within the element 1002 are icons 1004 for representing individual profiles. Each icon 1004 representing a profile located within the element 1002 is associated with a check box 1006, or other like selection feature. A user 9 may interact with the check box 1006 by selecting or deselecting the checkbox. By interacting with the check box 1006, the user 9 specifies whether the profile associated with the icon 1004 will be used by the system to generate search results when the system receives a contextual search, as previously discussed above. Also located within the element 1002 is a title block 1008 for the household profile. A user 9 may interact with the title block 1008 by selecting the title block. After selecting the title block 1008, the system may be configured to present a text field containing the name of the household profile and a submit button. The user 9 may edit the name of the household profile within the edit block and submit the name of the household profile by selecting the submit button. After the user 9 submits the name of the household profile, the title block 1008 will be updated with the new name.

Located on the outside of the element 1002, is a subsequent set of icons 1010, which individually represents individual profiles available to add to a household profile. The user 9 may create these individuals and create the associated user profile (otherwise described as the individual profile) for each individual (e.g., if they are not a customer of the institution) or the user profiles for these individuals may be created automatically by the system after the user 9 identifies the individual (e.g., name, ID number, etc.) and the system identifies the individuals as customers of the institution. The individual profiles associated with the subsequent icons 1010 will not be used in generating search results because they are not part of a household, or otherwise selected within the household. These icons 1010 may be added to the household profile. The arrow 1012 represents moving an icon 1010 into the household profile. This may be accomplished by the user 9 interacting with the icon 1010 such as clicking on the icon 1010, dragging and dropping the icon 1010 into the element 1002, or otherwise selecting the icon 1010. In some embodiments, after the icon has been dragged and dropped, or selected for placement, within the element, the system will include the profile associated with the icon 1010 in generating search results. In other embodiments, after being dropped within the element 1002 the icon 1010 will receive a checkbox 1006, as previously discussed which allows the user 9 to determine what user profiles of the individuals to include in the search results. Additionally, the user 9 may interact with the icons 1004 within the element 1002 in a similar manner as the user would interact with the icons 1010. The user 9 may select the icons 1004, drag and drop the icons to a place outside of the element 1002. Upon the occurrence of such an event, the system would remove the individual profile associated with the icon 1004 from the household and remove the checkbox 1006 associated with icon. Because the individual profile is no longer associated with the household profile, the system will not use the individual profile in generating search results.

The user 9 may add individual profiles that are not currently displayed on the interface 1000 in different ways. Represented by block 1014 is a button upon which if clicked will open up a dialog box for creating a profile. Additionally, where an individual profile exists but is not displayed on the interface 1000, the user may search for the profile by submitting information associated with the individual profile in the text box 1016 (e.g., name, ID number, etc.). The system may generate a list of available profiles from which the user 9 may select. Upon selecting a profile, the system will generate 1010 and associate such an icon with the selected profile. The user may interact with the icon 1010 as normal.

Both icons 1006 and icons 1010 may be further interacted with in order to edit the individual profile associated with each type of icon or remove the individual profile from the interface. By selecting each type of icon, the system will present, to the user, a dialog box 1018 for viewing information related to the individual profile. Dialog box 1018 comprises a button 1020 for allowing the user 9 to edit information associated with the individual profile, an image 1022 of the individual of the individual profile, and a tree based data structure 1024 relating to the information of the individual profile. The data structure 1024 comprises line items of data relating the specific pieces of information related to the individual profile. For example, the individual profile may contain information relating to financial accounts held by the individual of the individual profile. There may be multiple accounts within the financial account such as a checking account and a savings account. Further, the individual accounts may have information related to each. Located next to each line item of the data set 1024 is an arrow 1026 which the user 9 may interact with. By selecting the arrow 1026, the user may view sub information pertaining to the line item. Each piece of sub information may be in and of itself a line item capable of having sub information. In such a case, the sub line item would also be associated with an arrow 1026. Also located with the line item of the data set 1024 is a checkbox 1028. The user 9 may interact with the checkbox 9, by selecting the checkbox. By selecting and deselecting the checkbox, the user may specify to the system pieces of information for the system to use in generating search results. For example, the user 9 may be interested in including individual profile information relating to a checking account but not a savings account. The user 9 may deselect a line item labeled accounts in which case all sub line items would be deselected. The user 9 may then show the sub line items by selecting the arrow 1026. The user may then select the checkbox 1028 for the checking account. This would inform the system to include the checking account information in generating contextual searches. In other embodiments of the invention, the individual profile information may be included along with the individual account information and the user 9 may select or deselect what information to include or not include in the contextual searches.

The system may be developed with a feature for easily including all the information in an individual profile after the user deselects line item information in accordance with the above teaching. If the user 9 selects the checkbox 1006, all the checkboxes 1028 of the line items would automatically be checked for the individual profile associated with the icon 1004 related to the checkbox 1006. Alternatively, by deselecting the checkbox 1006, all the checkboxes 1028 would all be deselected for the individual profile associated with the icon 1004 related to the checkbox 1006.

Similar to the household profile interface 1000, FIG. 10 illustrates a household profile interface 1100. Household profile interface 1100 contains all the features of household profile 1000. Household profile 1100 comprises an element 1102 similar to element 1002 with icons 1110 similar to icons 1004. However, element 1102 comprises sub elements 1106 and a title block 1104. Similar to the element 1004, the user 9 may drag and drop icons 1010 into the sub-elements 1106.

Sub elements 1106 are in a hierarchal relationship with the element 1102. The sub elements 1106 represent a subset of the main household profile represented by the element. Individuals profiles within the sub elements 1106 act as if they were part of a single household profile. However, the individual profiles may not share a relationship with elements outside of the sub-element. On the other hand, individual profiles that are located within the element 1102 but outside the sub-element 1106 do share a relationship with those profiles located within the sub-element. For example, a household profile for a business may be represented by an element. The element may include sub elements which represent different groups of the business (i.e. sales, marketing, etc.). Individual profiles associated with each group are included within the sub elements. Therefore, individual profiles relating to individuals working in sales would be placed into the sales sub-element. If a person from sales were to submit a contextual search, the system may use each individual profile from the sub element to generate search results. The system would not use individual profiles from other sub elements however (i.e. marketing) or individual profiles from profiles located within the confines of the element. The business household profile may also include a profile for the president of the company that is located within the element. If the president of the company were to submit a contextual search, the system could refer to all profiles located within the element including each sub element. In the case an individual who had an individual profile located within the element 1102 but not within the a sub element 1106, the individual could interact with checkbox 1112 in order to deselect the individual profiles of a sub element 1106 so that such individual profiles would not be used by the system to generate search results based on the individual submitting a contextual search. It is important to note that the sub-elements have hierarchy capability, wherein sub-elements may comprise further sub-elements. Moreover, the user 9 initiating the search may be able to select various elements 1102, sub-elements 1106 within the elements 1102, and/or individual within the elements 1102 and/or sub-elements 1106 in order to include or exclude individuals from a contextual search. For example, a user 9 may select individual 1110 and the marketing element 1112 to include in the contextual search.

The title block of 1104 and the title block of the sub-elements 1106 may are similar to the title block 1008. In addition to the functionality of title block 1008, the user 9 may further interact with the title block 1104 and the title blocks of sub-elements 1106. When the user selects the aforementioned title block, the system may present an option block the user for the purpose of editing the title of the household profile or respective group within the household profile or to add a group to the element 1102 or the respective sub-element 1106. If the user 9 selects the option to create a group, the system will populate the element 1102 or the sub-element 1106 with an additional sub-element.

It should be noted that each icon 1004/1010/1110 may be any icon used to describe the individual profile associated with the icon. The icon may be set manually by the user or defined automatically by the system based on an individual profile. By selecting the icons the user 9 may be presented with an individual profile interface to add, delete, or edit information associated with the individual. Additionally, the icon may further comprise sub-icons used to differentiate the individual profiles. For example, the sub-icon may be used to distinguish that the individual profile associated with the icon is a member of the financial institution. In another example, the sub-icon may be used to distinguish the individual profile is a favorite of the user (e.g., different colors, numbered, different types of icons, or the like). The sub-icons may be configured for interacting with the user 9 and upon such an interaction, the system may be configured to perform a function. The sub-icons may be located appropriately in relation to the icon to suggest the sub-icon and the icon are related. The sub-icons may be set manually by the user or may be set automatically based on data located with the user profile. Additionally, the sub-icon may be set based on information outside the user profile. For example, where an individual is a part of a messaging system and the individual profile of the user is connected to the messaging system, the system may generate a sub-icon stating the user is connected to the messaging system.

The interfaces 1000, 1100 provide various ways by which a user 9 submitting a contextual search may specify individual profiles and information relating to the individual profiles in order for the system to generate search results. Setting up such a scenario may be time consuming for the user 9. To aid the user, the system may be configured to save a profile setup of the individual profiles at the time of the search. The system may perform such a feature in multiple ways such as: 1) allowing the user to identify the setup and save the setup using a custom name; and 2) saving the setup in conjunction with submitting the contextual search in a search history. With respect to the first recitation, a user 9 would specify the information associated with the individual profiles to use. The system may allow the user to save the setup and save the setup to memory. For example, a user may be interested in receiving search results based on a business household profile. Specifically, the user may be interested in receiving search results on behalf of the sales team. The user may specify individual profiles and information associated with each profile to include in generating the search results. The user may save the settings under a title "Sales Team". If the user needs to perform a subsequent search at a later time on behalf of the sales team, the system may provide the user with a list of saved setups and the user may select the "Sales Team" setup from the list.

With respect to the second recitation. The system may automatically create a history of search results and include in the history the profile information used to generate the search results. When a user needs to generate a search similar to that of one automatically saved in the history, the system may provide a list of historical searches and allow the user to select one of the searches. The user may then edit the search terms and individual profiles included within the search in order to meet the user's present needs.

FIG. 11 illustrates a contextual search tool environment 1, in accordance with an embodiment of the present invention. As illustrated in FIG. 11, the user computer systems 10 are operatively coupled, via a network 2 to the contextual search systems 20, the advisor systems 30, other financial institution systems 40, or third party systems 50. As discussed herein, in this way, the user computer systems 10 may be utilized by users 9 in order to utilize a contextual search tool to receive more relevant search results based on input for dynamic contextual information, selections of the search results, review of content identified during the search, or the like. FIG. 11 illustrates only one example of embodiments of a contextual search tool system environment 1, and it will be appreciated that in other embodiments one or more of the systems (e.g., computers, mobile devices, servers, or other like systems) may be combined into a single system or be made up of multiple systems.

The network 2 may be a global area network (GAN), such as the Internet, a wide area network (WAN), a local area network (LAN), or any other type of network or combination of networks. The network 2 may provide for wireline, wireless, or a combination of wireline and wireless communication between devices on the network 2.

As illustrated in FIG. 11, the user computer systems 10 generally comprise a communication device 12, a processing device 14, and a memory device 16. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 14 is operatively coupled to the communication device 12 and the memory device 16. The processing device 14 uses the communication device 12 to communicate with the network 2 and other devices on the network 2, such as, but not limited to, the contextual search systems 20, the advisor systems 30, and other financial institution systems 40, or third-party systems 50. As such, the communication device 12 generally comprises a modem, server, or other device for communicating with other devices on the network 2, and a display, camera, keypad, mouse, keyboard, microphone, and/or speakers for communicating with one or more users 9. The user computer systems 10 may include, for example, a personal computer, a laptop, a mobile device (e.g., phone, smartphone, tablet, or personal display device ("PDA"), or the like) or other devices, or the like.

As further illustrated in FIG. 11, the user computer systems 10 comprises computer-readable instructions 18 stored in the memory device 16, which in one embodiment includes the computer-readable instructions 18 of a web browser or application 17. In some embodiments, the memory device 16 includes a datastore 19 for storing data related to the user computer systems 10, including but not limited to data created and/or used by the web browser or application 17. As discussed above the web browser or application 17 allows the users 9 to communicate with the contextual search application 27 (e.g., the contextual search tool, or the like), the advisor application 37, or other applications provided by the financial institution or third-party in order to send and receive information for the contextual search and contextual search results. In some embodiments a web browser is used to access websites, applications, or the like; however, in other embodiments a specific application (e.g., mobile application, computer application, or the like) is specifically configured to communicate with the other systems and applications within the contextual search tool environment 1. In still other embodiments of the invention portions of other applications may be stored on the user computer systems 10, such as but not limited to the contextual search application 27, the advisor application 37, or other applications.

As further illustrated in FIG. 11, the contextual search systems 20 generally comprise a communication device 22, a processing device 24, and a memory device 26. The processing device 24 is operatively coupled to the communication device 22 and the memory device 26. The processing device 24 uses the communication device 22 to communicate with the network 2, and other devices on the network 2, such as, but not limited to, the user computer systems 10, advisor systems 30, other financial institution systems 40, or third-party systems 50. As such, the communication device 22 generally comprises a modem, server, or other device(s) for communicating with other devices on the network 2.

As illustrated in FIG. 11, the contextual search systems 20 comprise computer-readable program instructions 28 stored in the memory device 26, which in one embodiment includes the computer-readable instructions 28 of a contextual search application 27. In some embodiments, the memory device 26 includes a datastore 29 for storing data related to the contextual search systems 20, including but not limited to data created and/or used by the contextual search application 27. The contextual search application 27 (e.g., the contextual search tool, or the like), as discussed above, receives the search from the user 9, determines search results and dynamic contextual information to present to the user 9 in order to receive user input for the dynamic contextual information (or other user input) to improve upon the search results. In addition, to receiving input from the users 9, search terms and dynamic contextual information may be received from advisors 7. The search results, updated search results, content, updated content, dynamic contextual information, and/or updated dynamic contextual information may be displayed to users 9 through the contextual search application 27 on the user's web browser or application 17 on the user computer systems 10 (e.g., laptops, mobile devices such as smartphones or tablets, or the like) or on any other type of system utilized by the users 9 (e.g., ATMs, kiosks, terminals, or the like).

As further illustrated in FIG. 11, the advisor systems 30 generally comprise a communication device 32, a processing device 34, and a memory device 36. The processing device 34 is operatively coupled to the communication device 32 and the memory device 36. The processing device 34 uses the communication device 32 to communicate with the network 2, and other devices on the network 2, such as, but not limited to, the user computer systems 10, the contextual search systems 20, the other financial institution systems 40, and or the third-party systems 50. As such, the communication device 32 generally comprises a modem, server, or other devices for communicating with other devices on the network 2.

As illustrated in FIG. 11, the advisor systems 30 comprise computer-readable program instructions 38 stored in the memory device 36, which in one embodiment includes the computer-readable instructions 38 of an advisor application 37. In some embodiments, the memory device 36 includes a datastore 39 for storing data related to the advisor systems 30, including but not limited to data created and/or used by the advisor application 37. The advisor application 37 allows the user 9, in one embodiment, to communicate with the advisor 7 and allows the advisor 7 to provide information to the contextual search to improve the search results of the user 9.

The other financial institution systems 40 are operatively coupled to the user computer systems 10, contextual search systems 20, advisor systems 30, or third-party systems 50, through the network 2. The other financial institution systems 40 have devices the same as or similar to the devices described for the user computer systems 10, contextual search systems 20, and advisor systems 30 (e.g., communication device, processing device, memory device with computer-readable instructions, datastore, or the like). Thus, the other financial institution systems 40 communicate with the user computer systems 10, contextual search systems 20, advisor systems 30, or third-party systems 50 in the same or similar way as previously described with respect to the user computer systems 10, contextual search systems 20, and/or the advisor systems 30. The other financial institution systems 40, in some embodiments, provide profile information or account information as described above, which may be used to improve the contextual search results.

The third-party systems 50 are operatively coupled to the user computer systems 10, contextual search systems 20, advisor systems 30, or other financial institution systems 40 through the network 2. The third-party systems 50 have devices the same as or similar to the devices described for the user computer systems 10, contextual search systems 20, advisor systems 30, and/or other financial institution systems 40 (e.g., communication device, processing device, memory device with computer-readable instructions, datastore, or the like). Thus, the third-party systems 50 communicate with the user computer systems 10, contextual search systems 20, advisor systems 30, and/or other financial institution systems 40 in the same or similar way as previously described with respect to each system. The third-party systems 50, in some embodiments, are comprised of systems of content providers, third-party financial institutions, financial service providers, software services, merchants, or the like that store and provide content information, profile information, account information, or the like for the contextual search. The contextual search tool is utilized to access these third-party systems based on the user search and the dynamic contextual information and provide the search results and associated content to the user 9.

It is understood that the systems and devices described herein illustrate one embodiment of the invention. It is further understood that one or more of the systems, devices, or the like can be combined or separated in other embodiments and still function in the same or similar way as the embodiments described herein.

The invention has been described herein as being implemented by a contextual search tool; however, it should be understood that in other embodiments of the invention other tools or applications, or systems or processors running the tools or applications may perform one or more of the steps of the present invention.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Pearl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks'.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for providing a contextual search tool that improves search results presented to a user, the system comprising:
   one or more memory devices; and
   one or more processing devices operatively coupled to the one or more memory devices, wherein the one or more processing devices are configured to execute computer-readable program code to:
   receive a search from the user;
   determine the search results to display in a contextual search interface based on the search;
   display the search results in a search results section of the contextual search interface, wherein the search results comprise a list of the search results;
   display content in a content section of the contextual search interface, wherein the content is for at least one of the search results from the search results section, and wherein the content section and the search results section are different sections;
   determine dynamic contextual information based on the search from the user and a household profile of the user, wherein the dynamic contextual information comprises household profile information associated with the household profile of the user, wherein the household profile information comprises profile information for a first individual and a second individual other than the user, wherein the profile information comprises at least a role of the first individual and a role of the second individual, the first individual and the second individual having different roles within the household profile, and wherein determining the search results and the dynamic contextual information is further based on the roles of the first and second individuals;

display the dynamic contextual information in a dynamic contextual information section of the contextual search interface, wherein the dynamic contextual information section is different from the search results section and the content section;

receive, via the dynamic contextual information section of the contextual search interface, contextual information input from the user, wherein the contextual information input comprises at least an edit to household profile information within the household profile used to update the search;

determine the user would like to communicate with an advisor based on the search or contextual information input from the user;

identify favorite advisors of at least one individual in the household profile;

determine an advisor to present to the user based on the favorite advisors of the at least one individual in the household profile;

initiate communication between the advisor and the user;

provide the advisor with access to the search;

receive input from the advisor related to the search;

determine updated search results, updated content, and updated dynamic contextual information based on the contextual information input from the user and the input from the advisor; and display the updated search results in the search results section, the updated content in the content section, and the updated dynamic contextual information in the dynamic contextual information section.

2. The system of claim 1, wherein the one or more processing devices are configured to execute computer-readable program code to:

receive profile information for the at least one individual of the household profile; and update the household profile based on receiving the profile information for the at least one individual.

3. The system of claim 1, wherein determining the search results to display in the contextual search interface is based on the household profile of the user.

4. The system of claim 1, wherein the one or more processing devices are configured to execute computer-readable program code to:

determine a portion of the household profile to use in determining the search results or the updated search results, or the dynamic contextual search or the updated dynamic contextual search, and wherein determining the portion of the household profile to use is based at least in part on the search received from the user.

5. The system of claim 1, wherein the dynamic contextual information and the updated dynamic contextual information change based on the search from the user, the contextual information input from the user, the search results selected by the user, and time the user spends on viewing the content section.

6. The system of claim 1, wherein the one or more processing devices are further configured to execute computer-readable program code to:

receive user profile information, and wherein determining the search results or the updated search results is based in part on the user profile information; and receive user account information, and wherein determining the search results or the updated search results is based in part on the user account information.

7. The system of claim 1, wherein the one or more processing devices are further configured to execute computer-readable program code to:

determine at least one of the search results selected by the user; and determine the updated search results and the updated dynamic contextual information based on the at least one of the search results selected by the user.

8. A computer program product for providing a contextual search tool that improves search results presented to a user, the computer program product comprising at least one non-transitory computer-readable medium having computer-readable program code portions embodied therein, the computer-readable program code portions comprising:

an executable portion configured for receiving a search from the user;

an executable portion configured for determining the search results to display in a contextual search interface based on the search;

an executable portion configured for displaying the search results in a search results section of the contextual search interface, wherein the search results comprise a list of the search results;

an executable portion configured for displaying content in a content section of the contextual search interface, wherein the content is for at least one of the search results from the search results section, and wherein the content section and the search results section are different sections;

an executable portion configured for determining dynamic contextual information based on the search from the user and a household profile of the user, wherein the dynamic contextual information comprises household profile information associated with the household profile of the user, wherein the household profile information comprises profile information for a first individual and a second individual other than the user, wherein the profile information comprises at least a role of the first individual and a role of the second individual, the first individual and the second individual having different roles within the household profile, and wherein determining the search results and the dynamic contextual information is further based on the roles of the first and second individuals;

an executable portion configured for displaying the dynamic contextual information in a dynamic contextual information section of the contextual search interface, wherein the dynamic contextual information section is different from the search results section and the content section;

an executable portion configured for receiving, via the dynamic contextual information section of the contextual search interface, contextual information input from the user, wherein the contextual information input comprises at least an edit to household profile information within the household profile used in updating the search;

an executable portion configured for determining the user would like to communicate with an advisor based on the search or contextual information input from the user;

an executable portion configured for identifying favorite advisors of at least one individual in the household profile;
an executable portion configured for determining an advisor to present to the user based on the favorite advisors of the at least one individual in the household profile;
an executable portion configured for initiating communication between the advisor and the user;
an executable portion configured for providing the advisor with access to the search;
an executable portion configured for receiving input from the advisor related to the search;
an executable portion configured for determining updated search results, updated content, and updated dynamic contextual information based on the contextual information input from the user and the input from the advisor; and
an executable portion configured for displaying the updated search results in the search results section, the updated content in the content section, and the updated dynamic contextual information in the dynamic contextual information section.

9. The computer program product of claim 8, wherein the computer-readable program code portions further comprise:
an executable portion configured for receiving profile information for the at least one individual of the household profile; and
an executable portion configured for updating the household profile based on receiving the profile information for the at least one individual.

10. The computer program product of claim 8, wherein the executable portion configured for determining the search results to display in the contextual search interface is based on the household profile of the user.

11. The computer program product of claim 8, wherein the computer-readable program code portions further comprise:
an executable portion configured for determining a portion of the household profile to use in determining the search results or the updated search results, or the dynamic contextual search or the updated dynamic contextual search, and wherein determining the portion of the household profile to use is based at least in part on the search received from the user.

12. The computer program product of claim 8, wherein the dynamic contextual information and the updated dynamic contextual information change based on the search from the user, the contextual information input from the user, the search results selected by the user, and time the user spends on viewing the content section.

13. The computer program product of claim 8, wherein the computer-readable program code portions further comprise:
an executable portion configured for receiving user profile information, and wherein determining the search results or the updated search results is based in part on the user profile information; and
an executable portion configured for receiving user account information, and wherein determining the search results or the updated search results is based in part on the user account information.

14. The computer program product of claim 8, wherein the computer-readable program code portions further comprise:
an executable portion configured for determining at least one of the search results selected by the user; and
an executable portion configured for determining the updated search results and the updated dynamic contextual information based on the at least one of the search results selected by the user.

15. A method for providing a contextual search tool that improves search results presented to a user, the method comprising:
receiving, by a hardware processor, a search from the user;
determining, by the hardware processor, the search results to display in a contextual search interface based on the search;
displaying, by the hardware processor, the search results in a search results section of the contextual search interface, wherein the search results comprise a list of the search results;
displaying, by the hardware processor, content in a content section of the contextual search interface, wherein the content is for at least one of the search results from the search results section, and wherein the content section and the search results section are different sections;
determining, by the hardware processor, dynamic contextual information based on the search from the user and a household profile of the user, wherein the dynamic contextual information comprises household profile information associated with the household profile of the user, wherein the household profile information comprises profile information for a first individual and a second individual other than the user, wherein the profile information comprises at least a role of the first individual and a role of the second individual, the first individual and the second individual having different roles within the household profile, and wherein determining the search results and the dynamic contextual information is further based on the roles of the first and second individuals;
displaying, by the hardware processor, the dynamic contextual information in a dynamic contextual information section of the contextual search interface, wherein the dynamic contextual information section is different from the search results section and the content section;
receiving, by the hardware processor, via the dynamic contextual information section of the contextual search interface, contextual information input from the user, wherein the contextual information input comprises at least an edit to household profile information within the household profile used in updating the search; and
determining, by the hardware processor, the user would like to communicate with an advisor based on the search or contextual information input from the user;
identifying, by the hardware processor, favorite advisors of at least one individual in the household profile;
determining, by the hardware processor, an advisor to present to the user based on the favorite advisors of the at least one individual in the household profile;
initiating, by the hardware processor, communication between the advisor and the user;
providing, by the hardware processor, the advisor with access to the search;
receiving, by the hardware processor, input from the advisor related to the search;
determining, by the hardware processor, updated search results, updated content, and updated dynamic contextual information based on the contextual information input from the user and the input from the advisor; and
displaying, by the hardware processor, the updated search results in the search results section, the updated content in the content section, and the updated dynamic contextual information in the dynamic contextual information section.

16. The method of claim 15, comprising:
receiving profile information for the at least one individual of the household profile; and
updating the household profile based on receiving the profile information for the at least one individual.

17. The method of claim 15, wherein determining the search results to display in the contextual search interface is based on the household profile of the user.

18. The method of claim 15, comprising determining a portion of the household profile to use in determining the search results or the updated search results, or the dynamic contextual search or the updated dynamic contextual search, and wherein determining the portion of the household profile to use is based at least in part on the search received from the user.

19. The method of claim 15, wherein the dynamic contextual information and the updated dynamic contextual information change based on the search from the user, the dynamic contextual input from the user, the search results selected by the user, and time the user spends on viewing the content section.

20. The method of claim 15, comprising:
receiving user profile information, and wherein determining the search results or the updated search results is based in part on the user profile information; and
receiving user account information, and wherein determining the search results or the updated search results is based in part on the user account information.

* * * * *